United States Patent
Huang et al.

(10) Patent No.: US 8,126,713 B2
(45) Date of Patent: Feb. 28, 2012

(54) CONVERSATION CONTROL SYSTEM AND CONVERSATION CONTROL METHOD

(76) Inventors: Shengyang Huang, Tokyo (JP); Hiroshi Katukura, Tokyo (JP); Tao Wu, Tokyo (JP); Dong Li, Tokyo (JP)

( * ) Notice: Subject to any disclaimer, the term of this patent is extended or adjusted under 35 U.S.C. 154(b) by 68 days.

(21) Appl. No.: 10/511,236

(22) PCT Filed: Apr. 10, 2003
(Under 37 CFR 1.47)

(86) PCT No.: PCT/JP03/04563
§ 371 (c)(1),
(2), (4) Date: Sep. 26, 2005

(87) PCT Pub. No.: WO03/085550
PCT Pub. Date: Oct. 16, 2003

(65) Prior Publication Data
US 2007/0033040 A1    Feb. 8, 2007

(30) Foreign Application Priority Data

Apr. 11, 2002   (JP) ................................ 2002-108969
Apr. 26, 2002   (JP) ................................ 2002-126610
Apr. 26, 2002   (JP) ................................ 2002-126732
Apr. 26, 2002   (JP) ................................ 2002-126752

(51) Int. Cl.
*G10L 15/04* (2006.01)
*G10L 15/18* (2006.01)

(52) U.S. Cl. ..................................... 704/254; 704/257

(58) Field of Classification Search .............. 704/9, 251, 704/254, 257
See application file for complete search history.

(56) References Cited

U.S. PATENT DOCUMENTS
6,044,347 A    3/2000  Abella et al.
(Continued)

FOREIGN PATENT DOCUMENTS
JP        04-169969        6/1992
(Continued)

OTHER PUBLICATIONS

Sep. 1, 2000 "Morpheme-based, cross-lingual indexing for medical document retrieval" Schulz et al. International Journal of Medical Informatics vol. 58-59 pp. 87-99.

(Continued)

*Primary Examiner* — Angela A Armstrong
(74) *Attorney, Agent, or Firm* — Jordan and Hamburg LLP

(57) ABSTRACT

The present invention includes a morpheme extracting unit 420 configured to extract, based on a character string corresponding to input information, at least one morpheme constituting a minimum unit of the character string, as first morpheme information, a topic search unit 340 configured to compare the first morpheme information extracted at the morpheme extracting unit 420 with topic titles, and to search a topic title corresponding to the first morpheme information from among the topic titles, and a reply retrieval unit 350 configured to retrieve, based on the topic title searched at a topic identification information search unit 320, a reply sentence associated with the topic title.

14 Claims, 28 Drawing Sheets

U.S. PATENT DOCUMENTS

| | | | |
|---|---|---|---|
| 6,101,492 A * | 8/2000 | Jacquemin et al. | 707/3 |
| 6,173,266 B1 | 1/2001 | Marx et al. | |
| 6,314,402 B1 | 11/2001 | Monaco et al. | |
| 6,321,198 B1 | 11/2001 | Hank et al. | |
| 6,324,513 B1 | 11/2001 | Nagai et al. | |
| 6,385,583 B1 | 5/2002 | Ladd et al. | |
| 6,411,924 B1 * | 6/2002 | de Hita et al. | 704/9 |
| 6,434,525 B1 | 8/2002 | Nagisa et al. | |
| 6,505,162 B1 | 1/2003 | Wang et al. | |
| 6,510,411 B1 | 1/2003 | Norton et al. | |
| 6,553,345 B1 | 4/2003 | Kuhn et al. | |
| 6,901,402 B1 * | 5/2005 | Corston-Oliver et al. | 707/101 |
| 6,944,594 B2 | 9/2005 | Busayapongchai et al. | |
| 7,003,459 B1 | 2/2006 | Gorin et al. | |
| 7,016,849 B2 | 3/2006 | Arnold et al. | |
| 7,020,607 B2 * | 3/2006 | Adachi | 704/257 |
| 7,177,817 B1 | 2/2007 | Khosla et al. | |
| 7,197,460 B1 | 3/2007 | Gupta et al. | |
| 7,305,070 B2 | 12/2007 | Kortum et al. | |
| 7,415,406 B2 | 8/2008 | Huang et al. | |
| 2002/0143776 A1 * | 10/2002 | Hirose et al. | 707/10 |
| 2003/0110037 A1 | 6/2003 | Walker et al. | |
| 2003/0163321 A1 | 8/2003 | Mault | |
| 2004/0098245 A1 * | 5/2004 | Walker et al. | 704/1 |
| 2005/0144013 A1 | 6/2005 | Fujimoto et al. | |
| 2006/0020473 A1 | 1/2006 | Hiroe et al. | |
| 2006/0074634 A1 | 4/2006 | Gao et al. | |
| 2006/0149555 A1 | 7/2006 | Fabbrizio et al. | |
| 2007/0094003 A1 | 4/2007 | Huang et al. | |
| 2007/0094004 A1 | 4/2007 | Huang et al. | |
| 2007/0094007 A1 | 4/2007 | Huang et al. | |

FOREIGN PATENT DOCUMENTS

| | | |
|---|---|---|
| JP | 07-282134 | 10/1995 |
| JP | 11-143493 | 5/1999 |
| JP | 2001-357053 | 12/2001 |
| JP | 2004-145606 | 5/2004 |
| JP | 2004-258904 | 9/2004 |

OTHER PUBLICATIONS

Sep. 5, 1999 "Utilizing prosody for unconstrained morpheme recognition" Strom et al. Proceedings of Eurospeech vol. 1 pp. 307-310.

Sep. 13, 2000 "Morpheme based language models for speech recognition of czech" Byrne et al. Text, Speech and Dialogue, International Workshop, TSD, Proceedings pp. 211-216.

* cited by examiner

FIG. 4

| | MEANING | DATA EXAMPLE |
|---|---|---|
| DA | DECLARATIVE AFFIRMATIVE SENTENCE | I LIKE SATO |
| LA | LOCATIONAL AFFIRMATIVE SENTENCE | I LIKE HIS SERIOUS FACE WHEN HE IS AT BAT |
| NA | NEGATIONAL AFFIRMATIVE SENTENCE | I DON'T WANT TO TALK WITH ANYONE WHO DISLIKES SATO |
| DQ | DECLARATIVE INTERROGATIVE SENTENCE | DO YOU LIKE SATO ? |
| LQ | LOCATIONAL INTERROGATIVE SENTENCE | HOW DO YOU LIKE SATO AT BAT ? |
| NQ | NEGATIONAL INTERROGATIVE SENTENCE | IT ISN'T TRUE THAT YOU LIKE SATO, IS IT ? |
| ... | ... | ... |

FIG. 5

| TYPE OF DETERMINATION | USED DICTIONARY |
|---|---|
| D | DEFINITION EXPRESSION DICTIONARY |
| N | NEGATIONAL EXPRESSION DICTIONARY |
| ⋮ | ⋮ |

FIG. 8

| TOPIC IDENTIFICATION INFORMATION (A MOVIE) | TOPIC TITLE | | |
|---|---|---|---|
| | FIRST IDENTIFICATION INFORMATION | SECOND IDENTIFICATION INFORMATION | THIRD IDENTIFICATION INFORMATION |
| | A MOVIE | * | * |
| | A MOVIE | * | EXITING |
| ... | ... | ... | ... |
| ... | ... | ... | ... |

FIG. 9

<< TYPE OF REPLY SENTENCE >>

| TYPE | CONTENT |
|------|---------|
| D | DECLARATIVE SENTENCE |
| T | DECLARATIVE SENTENCE INCLUDING IDEA OF TIME SUCH AS "WHEN" |
| L | DECLARATIVE SENTENCE INCLUDING IDEA OF LOCATION SUCH AS "WHERE" |
| N | SENTENCE NEGATING DECLARATIVE SENTENCE |
| ... | ... |

FIG. 10

| TOPIC IDENTIFICATION INFORMATION (SATO) SUBORDINATE CONCEPT = (HOME RUN) SUPERORDINATE CONCEPT = (SANDLOT BASEBALL) SYNONYM = (PANDA SATO, PLAYER SATO, PANDA) | | | |
|---|---|---|---|
| | | TYPE OF RESPONSE | CONTENT |
| TOPIC TITLE 1-1 (SATO ; * ; LIKE) | REPLY SENTENCE 1-1 | DA | I LIKE SATO TOO |
| | REPLY SENTENCE 1-2 | TA | I LIKE SATO AT BAT |
| | ... | ... | ... |
| TOPIC TITLE 1-2 | | | |
| ... | | | |

FIG. 18

| | CONVERSATION EVENT | | | |
|---|---|---|---|---|
| | COHESION FACTOR | CONVERSATION CHANGE | HARASSMENT FACTOR | OPPOSITION FACTOR |
| ELLIPTICAL SENTENCE SUPPLEMENTATION PROCESSING | ○ | | | |
| REPLY IMPOSSIBLE PROCESSING | | | ○ | |
| UTTERANCE TYPE DETERMINATION PROCESSING | | | | ○ |
| TOPIC IDENTIFICATION INFORMATION RETRIEVAL | | ○ | | |

FIG. 25

| TOPIC IDENTIFICATION INFORMATION (HORSE) | | | |
|---|---|---|---|
| TOPIC TITLE 1 (HORSE ; * ; LIKE) | TYPE OF RESPONSE | PRIORITY LEVEL | REPLY SENTENCE |
| | DQ (DECLARATIVE INTERROGATIVE SENTENCE) | 3 | REPLY SENTENCE 1-1 |
| | | 2 | REPLY SENTENCE 1-2 |
| | | 1 | REPLY SENTENCE 1-3 |
| | LQ (LOCATIONAL INTERROGATIVE SENTENCE) | 3 | REPLY SENTENCE 2-1 |
| | | ... | ... |
| | TQ (TIME INTERROGATIVE SENTENCE) | 3 | REPLY SENTENCE 3-1 |
| | | ... | ... |
| | ..... | ..... | ..... |
| TOPIC TITLE 2 ..... | | | |

FIG. 26

TOPIC IDENTIFICATION INFORMATION (HORSE)

TOPIC TITLE 1 (HORSE ;*; LIKE)
TYPE OF RESPONSE DA

| RANKING | PRIORITY LEVEL | REPLY SENTENCE |
|---|---|---|
| 3 | 3 | REPLY SENTENCE 1-1 (HORSES ARE REALLY ENERGETIC AND BEAUTIFUL, AREN'T THEY) |
| 2 | 2 | REPLY SENTENCE 1-2 (HORSES ARE REALLY BEAUTIFUL, AREN'T THEY) |
| 1 | 1 | REPLY SENTENCE 1-3 (HORSES ARE BEAUTIFUL, AREN'T THEY) |
| 0 | 0 | REPLY SENTENCE 1-4 (I THINK THE APPEARANCE OF HORSES IS ORDINARY) |
| -1 | -1 | REPLY SENTENCE 1-5 (I DON'T KNOW HORSES ARE BEAUTIFUL) |
| -2 | -2 | REPLY SENTENCE 1-6 (HORSES AREN'T BEAUTIFUL) |
| -3 | -3 | REPLY SENTENCE 1-7 (I HAVE NO INTEREST IN HORSES) |

FIG. 28

| OPPOSITION CONTENTS |
|---|
| SHUT UP |
| YOU IDIOT |
| |

FIG. 29

| APOLOGY CONTENTS |
|---|
| I WAS WRONG |
| I WON'T SAY BAD THINGS ANYMORE |
| |

CONVERSATION CONTROL SYSTEM AND CONVERSATION CONTROL METHOD

TECHNICAL FIELD

The present invention relates to a conversation control system and a conversation control method for retrieving a reply sentence suitable for input information provided from a user, based on the input information.

BACKGROUND ART

A conventional conversation control system outputs a stored reply sentence suitable for the contents of an utterance of a user, based on the contents of the utterance. Specifically, the conversation control system compares the contents of an utterance of a user with a stored phrase group, so as to search a phrase matching the contents of the utterance from the phrase group. Then, a reply sentence associated with the phrase searched by the conversation control system is output. The user receiving the reply sentence from the conversation control system can feel as if he or she had a conversation with another user.

The above conversation control system, however, has a problem that a reply sentence appropriate to the contents of an utterance cannot be output unless a large number of phrases even slightly similar to the contents of the utterance are stored. If developers of the conversation control system store a huge number of phrases even slightly similar to the contents of an utterance and reply sentences associated with the huge number of phrases in the conversation control system, the conversation control system can output a reply sentence appropriate to the contents of the utterance.

However, in order to allow the conversation control system to search a phrase matching the contents of an utterance, the developers have to store an enormous phrase group in the conversation control system. It has therefore been difficult to develop a conversation control system for outputting a reply sentence appropriate to the contents of an utterance.

The present invention has been made in view of the above problems, and has an object of providing a conversation control system and a conversation control method which can identify morphemes constituting input information provided from a user, retrieve a prepared reply sentence associated with the identified morphemes, so as to output the most appropriate reply sentence to respond to the input information of the user, and also can output an appropriate reply sentence even with a reduced number of reply sentences stored.

DISCLOSURE OF THE INVENTION

The present invention is characterized by storing pieces of second morpheme information each showing a morpheme including a character, a string of characters or a combination thereof, and a plurality of reply sentences, which are associated with one another; extracting, based on a character string corresponding to input information received from a user, at least one morpheme constituting a minimum unit of the character string as first morpheme information; comparing the extracted first morpheme information with the pieces of second morpheme information, and searching a piece of second morpheme information corresponding to the first morpheme information from among the pieces of second morpheme information; and retrieving, based on the searched piece of second morpheme information, a reply sentence associated with the piece of second morpheme information, when retrieving a reply sentence to the input information based on the input information.

In the above-described invention, it is preferable that the pieces of second morpheme information are each associated with a plurality of reply sentences; the reply sentences are each associated with types of response; a type of input including affirmation or negation is determined based on the character string corresponding to the input information; the types of response associated with the piece of second morpheme information are compared with the determined type of input based on a searched piece of second morpheme information; a type of response corresponding to the type of input are searched from among the types of response; and a reply sentence associated with the searched type of response are retrieved.

In the above-described invention. It is preferable that pieces of topic identification information for identifying a topic are each associated with pieces of second identification information; the pieces of second identification information are each associated with reply sentences; the extracted first morpheme information is compared with the pieces of topic identification information; a piece of topic identification information corresponding to the morpheme constituting the first morpheme information is searched from among the pieces of topic identification information; pieces of second morpheme information associated with the searched piece of topic identification information are compared with the first morpheme information extracted at the morpheme extracting unit; and a piece of second morpheme information corresponding to the first morpheme information is searched from among the pieces of second morpheme information.

In the above-described invention, it is preferable that a piece of topic identification information searched last time is added to the extracted first morpheme information, when no piece of second morpheme information corresponding to the extracted first morpheme information can be searched from among the stored pieces of second morpheme information; and a piece of second morpheme information corresponding to the first morpheme information is searched from among the pieces of second morpheme information, based on the first morpheme information including the piece of topic identification information.

In the above-described invention, it is preferable that the pieces of second morpheme information are each associated with a plurality of reply sentences; the reply sentences are each associated with priority levels to be selected as a reply sentence; ranking is performed according to the frequency of previous search of a piece of second morpheme information; the priority levels associated with the piece of second morpheme information are compared with a determined rank, based on a piece of second morpheme information searched at that time; a priority level corresponding to the rank is identified from among the priority levels; and a reply sentence associated with the identified priority level is retrieved.

In the above-described invention, it is preferable that processing of retrieving a reply sentence is not performed, when the rank determined at the ranking unit is the lowest.

BRIEF DESCRIPTION OF DRAWINGS

FIG. 4 is a diagram illustrating the "types of uttered sentences" determined by an input type determining unit in the first embodiment;

FIG. 5 is a diagram illustrating details of dictionaries stored in an utterance type database in the first embodiment;

FIG. 8 is a diagram illustrating the contents of "topic titles" formed in the conversation database in the first embodiment;

FIG. 9 is a diagram illustrating the "types of reply sentences" associated with the "topic titles" formed in the conversation database in the first embodiment;

FIG. 10 is a diagram illustrating the contents of "topic titles" and "reply sentences" belonging to a piece of "topic identification information" formed in the conversation database in the first embodiment;

FIG. 18 is a diagram illustrating the contents of "conversation events" in the second embodiment;

FIG. 25 is a diagram illustrating the contents of a topic title and reply sentences searched at a reply retrieval unit in the third embodiment;

FIG. 26 is a diagram illustrating the relationship between ranks determined at a ranking unit and priority levels searched at the reply retrieval unit in the third embodiment;

FIG. 28 is a diagram illustrating the contents of opposition stored in a conversation database in the third embodiment; and FIG. 29 is a diagram illustrating the contents of apology stored in the conversation database in the third embodiment.

BEST MODE FOR CARRYING OUT THE INVENTION

First Embodiment

Figure 1:
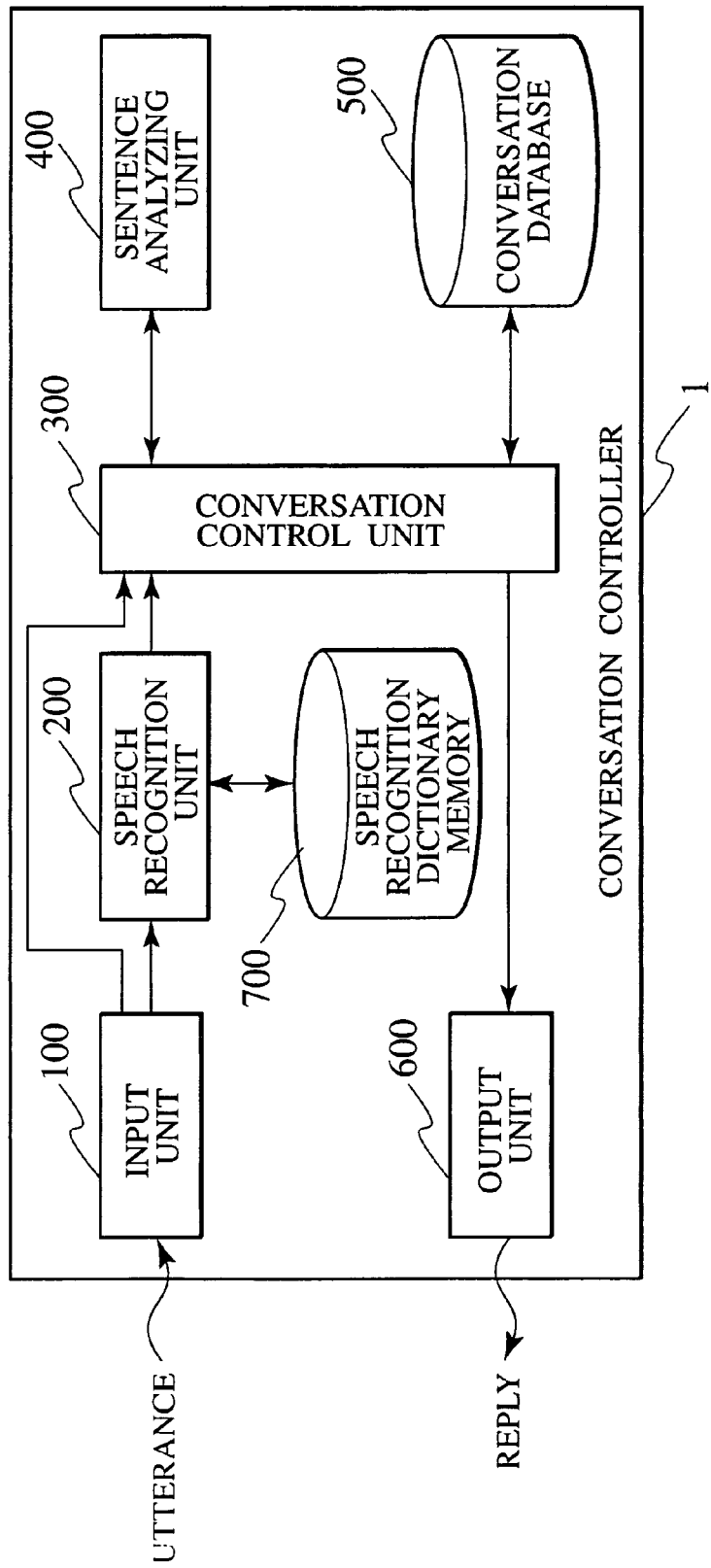
FIG. 1 is a block diagram illustrating a general configuration of a conversation controller according to a first embodiment.

A conversation control system according to the present invention will be described with reference to the drawings. FIG. 1 is a schematic structural diagram of the conversation control system including a conversation controller 1 according to this embodiment.

As shown in FIG. 1, the conversation controller 1 includes an input unit 100, a speech recognition unit 200, a conversation control unit 300, a sentence analyzing unit 400, a conversation database 500, an output unit 600, and a speech recognition dictionary memory 700. The contents of an utterance to be described below may alternatively be input information provided through a keyboard or the like. Therefore, the "contents of an utterance" to be described below can be replaced with "input information".

Likewise, the "type of an uttered sentence" (the type of utterance) may alternatively be the "type of an input" showing the type of input information provided through a keyboard or the like. Therefore, the "type of an uttered sentence" (the type of utterance) to be described below can be replaced with the "type of an input".

The input unit 100 receives input information provided from a user. The input unit 100 may be a microphone or a keyboard, for example. The input unit 100 also identifies a character string corresponding to input information provided from a user, based on the input information.

Specifically, the input unit 100 identifies a character string corresponding to input information other than input voice, based on the input information. The input unit 100 outputs the identified character string as a character string signal to the conversation control unit 300. The input unit 100 also receives the contents of an utterance provided from a user. The input unit 100 outputs a speech corresponding to the received contents of the utterance as a speech signal to the speech recognition unit 200.

The speech recognition unit 200 identifies a character string corresponding to the contents of an utterance retrieved by the input unit 100, based on the contents of the utterance. Specifically, the speech recognition unit 200, when receiving a speech signal from the input unit 100, compares the received speech signal with dictionaries stored in the speech recognition dictionary memory 700, based on the speech signal.

The speech recognition dictionary memory 700 stores character strings corresponding to standard speech signals. Upon the comparison, the speech recognition unit 200 identifies a character string corresponding to the speech signal. The speech recognition unit 200 outputs the identified character string as a character string signal to the conversation control unit 300.

Figure 2:
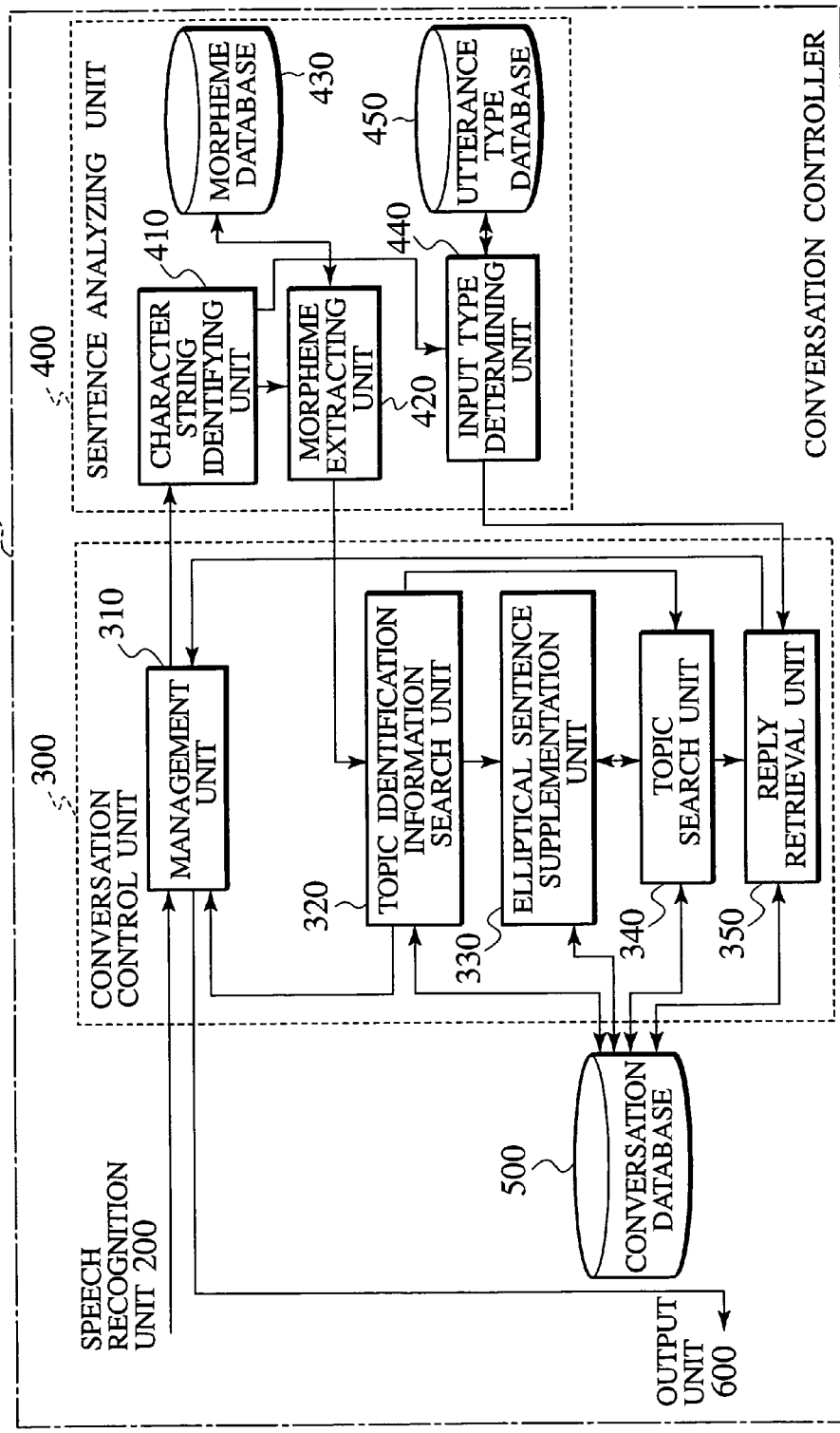
FIG. 2 is a block diagram illustrating internal structures of a conversation control unit and a sentence analyzing unit in the first embodiment.

The sentence analyzing unit 400 analyses a character string identified at the input unit 100 or the speech recognition unit 200. In this embodiment, as shown in FIG. 2, the sentence analyzing unit 400 includes a character string identifying unit 410, a morpheme extracting unit 420, a morpheme database 430, an input type determining unit 440, and an utterance type database 450.

The character string identifying unit 410 divides a character string identified at the input unit 100 and the speech recognition unit 200 into segments. A segment means a sentence resulting from dividing a character string as much as possible to the extent of not breaking the grammatical meaning. Specifically, when a character string includes a time interval exceeding a certain level, the character string identifying unit 410 divides the character string at that portion. The character string identifying unit 410 outputs the resulting character strings to the morpheme extracting unit 420 and the input type determining unit 440. A "character string" to be described below means a character string of a sentence.

Based on a character string of a sentence resulting from division at the character string identifying unit 410, the morpheme extracting unit 420 extracts from the character string of the sentence, morphemes constituting minimum units of the character string, as first morpheme information. In this embodiment, a morpheme means a minimum unit of a word structure shown in a character string. Minimum units of the word structure may be parts of speech including a noun, an adjective and a verb, for example. In this embodiment, as shown in FIG. 3, the morphemes are indicated at m1, m2, m3 . . . .

Figure 3:
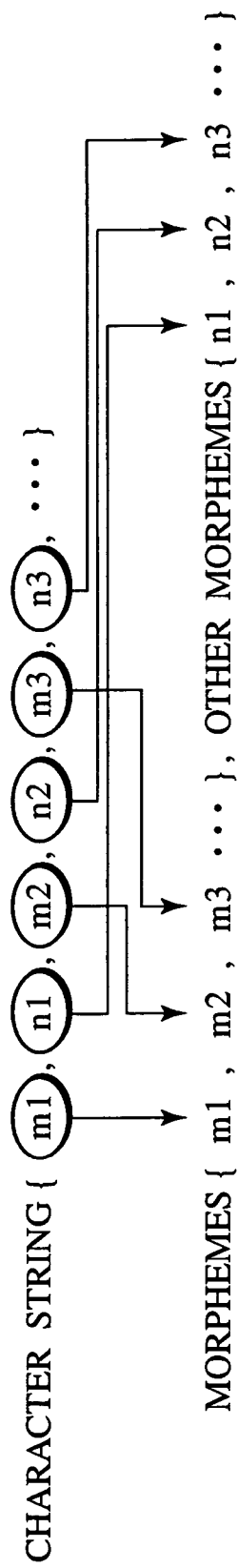
FIG. 3 is a diagram illustrating the contents of morphemes extracted at a morpheme extracting unit in the first embodiment.

More specifically, as shown in FIG. 3, when receiving a character string from the character string identifying unit 410, the morpheme extracting unit 420 compares the received character string with a morpheme group stored in the morpheme database 430 (the morpheme group is composed of parts of speech). Upon the comparison, the morpheme extracting unit 420 extracts from the character string, morphemes (m1, m2, . . . ) matching some of the stored morpheme group. Elements (n1, n2, n3 . . . ) other than the extracted morphemes may be auxiliary verbs, for example. The morpheme extracting unit 420 outputs the extracted morphemes as first morpheme information to a topic identification information search unit 320.

The input type determining unit 440 determines the type of contents of the utterance (the type of utterance), based on the character string identified at the character string identifying unit 410. In this embodiment, the type of utterance means one of the "types of uttered sentences" shown in FIG. 4, for example. In this embodiment, the "types of uttered sentences" include declarative sentences (D; Declaration), time sentences (T; Time), locational sentences (L; Location), and negational sentences (N; Negation) as shown in FIG. 4. The sentences of these types are formed in affirmative sentences or interrogative sentences.

A declarative sentence means a sentence showing the opinion or idea of a user. In this embodiment, the sentence "I like Sato" as shown in FIG. 4 is an affirmative sentence, for example. A locational sentence means a sentence including an idea of location. A time sentence means a sentence including an idea of time. A negational sentence means a sentence to negate a declarative sentence. Illustrative sentences of the "types of uttered sentences" are as shown in FIG. 4.

In this embodiment, when the input type determining unit 440 determines the "type of an uttered sentence", the input type determining unit 440 uses a declarative expression dictionary for determining that it is a declarative sentence, a negational expression dictionary for determining that it is a negational sentence, and the like, as shown in FIG. 5. Specifically, when receiving a character string from the character string identifying unit 410, the input type determining unit 440 compares the received character string with the dictionaries stored in the utterance type database 450, based on the character string. Upon the comparison, the input type determining unit 440 extracts elements relevant to the dictionaries from the character string.

Based on the extracted elements, the input type determining unit 440 determines the "type of the uttered sentence". When the character string includes elements declaring an event, for example, the input type determining unit 440 determines that the character string including the elements is a declarative sentence. The input type determining unit 440 outputs the determined "type of the uttered sentence" to a reply retrieval unit 350.

Figure 6:
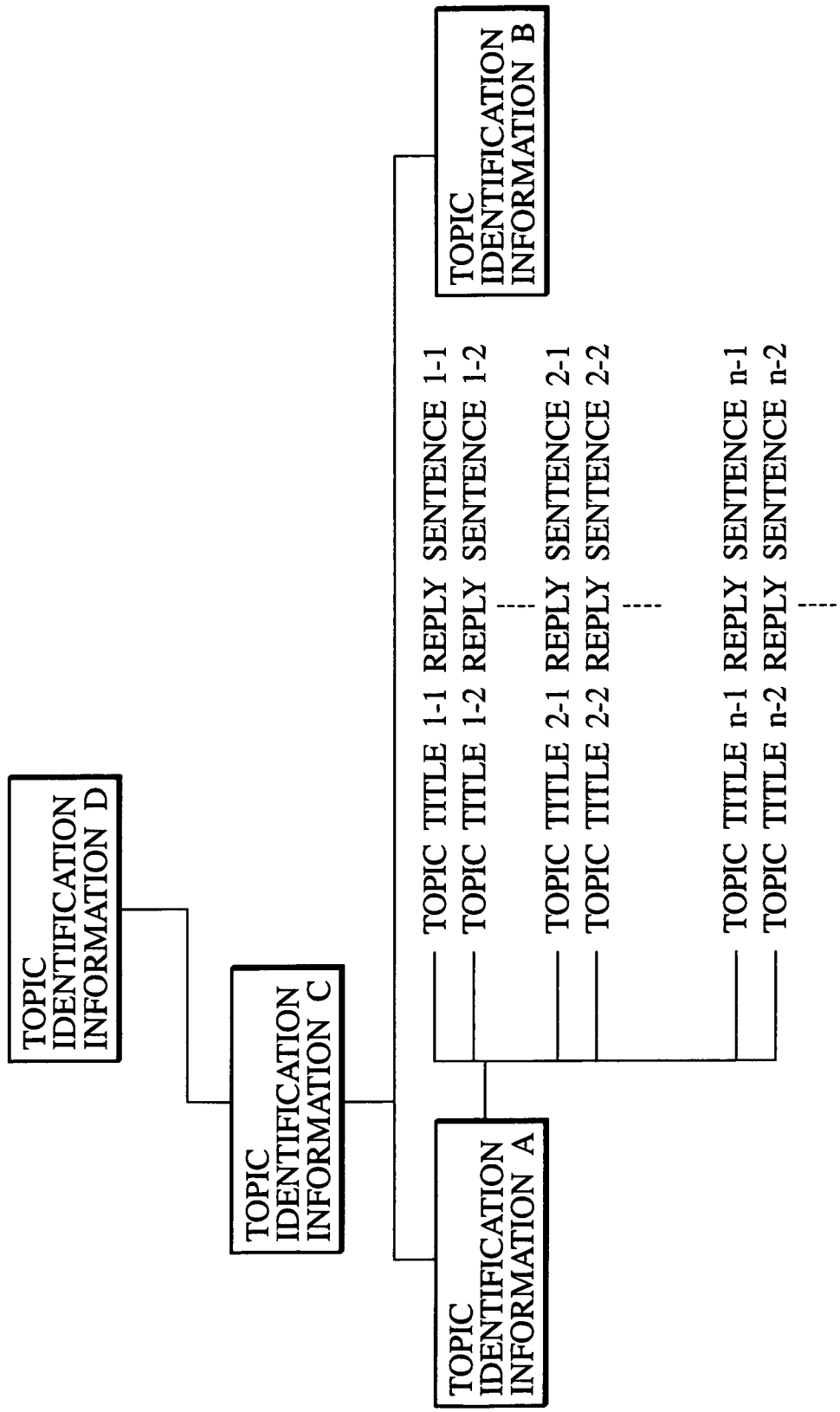
FIG. 6 is a diagram illustrating details of a hierarchical structure build in a conversation database in the first embodiment.

As shown in FIG. 6, the conversation database 500 stores a plurality of topic titles (second morpheme information) each showing a morpheme(s) consisting of a character, a string of characters or a combination thereof, and a plurality of reply sentences to the contents of utterances of users, which are associated with one another. The types of response showing the types of reply sentences are associated with the reply sentences, respectively.

The conversation database 500 also stores a plurality of pieces of topic identification information for identifying the topic of conversation. Specifically, in this embodiment, a piece of topic identification information means a keyword relevant to the contents of an input expected to be provided from a user or a reply sentence to a user. Each piece of topic identification information is associated with a plurality of topic titles. Each topic title is associated with reply sentences to users.

Figure 7:
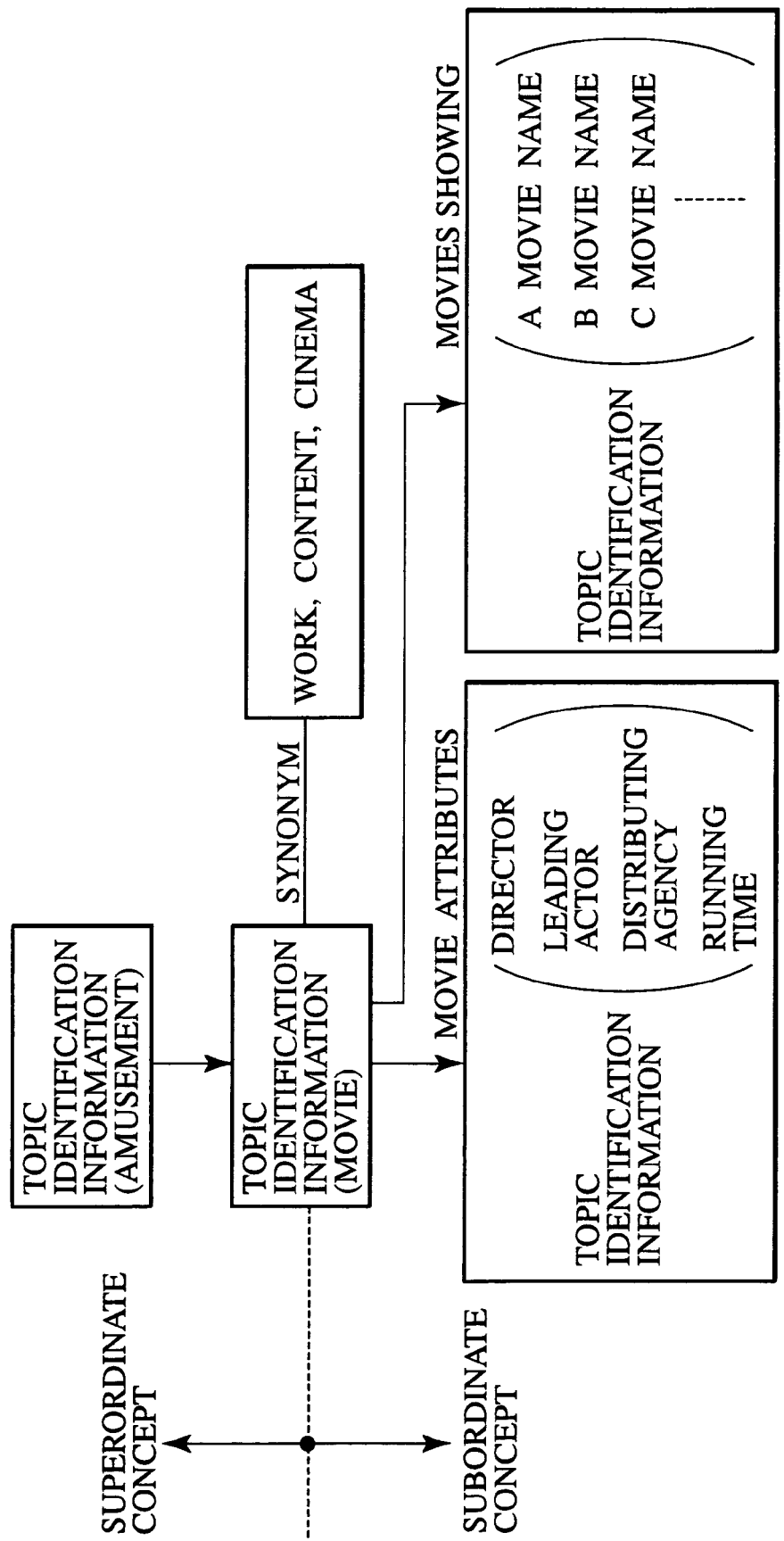
FIG. 7 is a diagram illustrating detailed relationships in the hierarchical structure built in the conversation database in the first embodiment.

In this embodiment, as shown in FIG. 7, each piece of topic identification information is stored in a clear relationship as a superordinate concept, a subordinate concept, a synonym or an antonym to another piece of topic identification information. For example, topic identification information (amusement) as a superordinate concept to topic identification information (movie) is stored in an upper level than the topic identification information (movie). Topic identification information (movie director, leading actor and so on) as a subordinate concept to the topic identification information (movie) is stored in a lower level than the topic identification information (movie).

In this embodiment, as shown in FIG. 8, each topic title is composed of first identification information, second identification information and third identification information. First identification information means a main morpheme constituting a topic, in this embodiment. The first identification information may be a subject of a sentence, for example. Second identification information means a morpheme having a close relevance to first identification information, in this embodiment. The second identification information may be an object, for example. Third identification information means a morpheme showing a movement of an object or a morpheme modifying a noun or the like, in this embodiment. The third identification information may be a verb, an adverb or an adjective, for example.

As shown in FIG. 8, when the subject is "A movie" and the adjective is "exciting", for example, the topic title consists of the morpheme "A movie" included in the first identification information and the morpheme "exiting" included in the third identification information. The topic title (A movie; *; exiting) has the meaning that "A movie is exiting.".

Included in the parenthesis of a topic title are first identification information, second identification information and third identification information in this order from the left, below. When a topic title includes no morpheme in an item of identification information, "*" is shown in that portion. The number of the items of identification information is not limited to three, as described above, and still another item of identification information may be included.

In this embodiment, as shown in FIG. 9, reply sentences are classified into different types (types of response) such as declaration (D; Declaration), time (T; Time), location (L; Location) and negation (N; Negation), in order to make a reply suitable for the type of an uttered sentence provided by a user. An affirmative sentence is indicated at "A", and an interrogative sentence is indicated at "Q".

When a topic title 1-1 is (Sato; *; like) {these are extracted morphemes included in "I like Sato"}, for example, reply sentences 1-1 associated with the topic title 1-1 include (DA; the declarative affirmative sentence "I like Sato too") and (TA; the time affirmative sentence "I like Sato at bat"). The reply retrieval unit 350 to be described below retrieves one of the reply sentences associated with the topic title.

In this embodiment, as shown in FIG. 2, the conversation control unit 300 includes a management unit 310, the topic identification information search unit 320, an elliptical sentence supplementation unit 330, a topic search unit 340, and the reply retrieval unit 350. The management unit 310 controls the entire conversation control unit 300.

The topic identification information search unit 320 compares first morpheme information extracted at the morpheme extracting unit 420 with pieces of topic identification information, and searches a piece of topic identification information corresponding to a morpheme constituting part of the first morpheme information from the pieces of topic identification information. Specifically, when the first morpheme information received from the morpheme extracting unit 420 is (Sato; *; like), the topic identification information search unit 320 compares the received first morpheme information with the topic identification information group.

Upon the comparison, when the topic identification information group includes a morpheme constituting part of the first morpheme information (e.g., "Sato"), the topic identification information search unit 320 searches "Sato" as topic identification information. The topic identification information search unit 320 outputs the searched topic identification information and the received first morpheme information as a topic search command signal to the topic search unit 340. On the other hand, when the first morpheme information includes nothing in the topic identification information group, the topic identification information search unit 320 outputs the received first morpheme information to the elliptical sentence supplementation unit 330.

Consequently, the topic search unit 340 to be described below can compare "topic titles" belonging to the "*topic identification information" determined at the topic identification information search unit 320 with the first morpheme information extracted at the morpheme extracting unit 420. It becomes unnecessary for the topic search unit 340 to compare all "topic titles" with the first morpheme information. As a result, the reply retrieval unit 350 to be described below can shorten the time to retrieve a final reply sentence.

Based on the first morpheme information extracted at the morpheme extracting unit 420, the elliptical sentence supplementation unit 330 adds topic identification information searched last time at the topic identification information search unit 320 to the extracted first morpheme information. Specifically, when the topic search unit 340 cannot search, from the stored topic titles, a topic title corresponding to first morpheme information (like) extracted at the morpheme extracting unit 420, the elliptical sentence supplementation unit 330 adds the topic identification information (Sato) searched last time by the topic identification information search unit 320 to the extracted first morpheme information (like).

That is, with first morpheme information as "W", and with searched topic identification information as "D", the elliptical sentence supplementation unit 330 adds the topic identification information "D" to the first morpheme information "W", and outputs the resulting first morpheme information as a search command signal to the topic search unit 340.

In this manner, when a sentence constituted by use of first morpheme information is an elliptical sentence and is unclear as Japanese, the elliptical sentence supplementation unit 330 can use topic identification information "D" previously searched at the topic identification information search unit 320, so as to add the topic identification information "D" (e.g., "Sato") to the first morpheme information "W" (*; *; like). As a result, the elliptical sentence supplementation unit 330 can make the first morpheme information (like) into first morpheme information (Sato; *; like) {I like Sato}.

That is, even if the contents of an utterance of a user constitute an elliptical sentence, the elliptical sentence supplementation unit 330 can supplement the elliptical sentence, using previously searched topic identification information. As a result, even when a sentence composed of first morpheme information is an elliptical sentence, the elliptical sentence supplementation unit 330 can make the sentence into correct Japanese.

Based on the supplemented first morpheme information, the topic search unit 340 can search an appropriate "topic title" related to the first morpheme information. Therefore, based on the appropriate "topic title" searched at the topic search unit 340, the reply retrieval unit 350 can output a reply sentence most suitable for the contents of the utterance of the user.

The elliptical sentence supplementation unit 330 is not limited to adding previously searched topic identification information to first morpheme information. Based on a topic title searched last time, the elliptical sentence supplementation unit 330 can add a morpheme included in any of the first identification information, second identification information and third identification information constituting the topic title to extracted first morpheme information.

The topic search unit 340 compares first morpheme information extracted at the morpheme extracting unit 420 or first morpheme information supplemented at the elliptical sentence supplementation unit 330, with topic titles, and searches a topic title corresponding to the first morpheme information from among the topic titles.

More specifically, when receiving a search command signal from the topic identification information search unit 320 and the elliptical sentence supplementation unit 330, the topic search unit 340 searches, based on topic identification information and first morpheme information included in the received search command signal, a topic title corresponding to the first morpheme information from among topic titles associated with the topic identification information. The topic search unit 340 outputs the searched topic title as a search result signal to the reply retrieval unit 350.

For example, as shown in FIG. 10, since the received first morpheme information (Sato; *; like) {I like Sato} includes topic identification information (Sato), the topic search unit 340 compares topic titles 1-1, 1-2... associated with the topic identification information (Sato) with the received first morpheme information (Sato; *; like).

Based on the result of the comparison, the topic search unit 340 searches the topic title 1-1 (Sato; *; like) corresponding to the received first morpheme information (Sato; *; like) from among the topic titles 1-1 to 1-2. The topic search unit 340 outputs the searched topic title 1-1 (Sato; *; like) as a search result signal to the reply retrieval unit 350.

Based on a topic title searched at the topic search unit 340, the reply retrieval unit 350 retrieves a reply sentence associated with the topic title. Also, based on a topic title searched at the topic search unit 340, the reply retrieval unit 350 compares different types of response associated with the topic title with the type of utterance determined at the input type determining unit 440. Upon the comparison, the reply retrieval unit 350 retrieves a type of response corresponding to the determined type of utterance from among the types of response.

As shown in FIG. 10, when a topic title searched at the topic search unit 340 is the topic title 1-1 (Sato; *; like), for example, the reply retrieval unit 350 identifies the type of response (e.g., DA) corresponding to the "type of the uttered sentence" (DA) determined at the input type determining unit 440, from among the reply sentences 1-1 (DA, TA and so on) associated with the topic title 1-1. Upon the identification of the type of response (DA), the reply retrieval unit 350 retrieves the reply sentence 1-1 (I like Sato too) associated with the identified type of response (DA), based on the type of response (DA).

"A" in "DA", "TA" and so on means an affirmative form. When the types of utterance and the types of response include "A", affirmation of a certain matter is indicated. The types of utterance and the types of response can include the types of "DQ", "TQ" and so on. "Q" in "DQ", "TQ" and so on means a question about a matter.

When the type of response is in the interrogative form "Q", a reply sentence associated with this type of response is made in the affirmative form (A). A reply sentence created in the affirmative form (A) may be a sentence for replying to a question. For example, when an uttered sentence is "Have you ever operated slot machines?" the type of utterance of the uttered sentence is the interrogative form (Q). A reply sentence associated with the interrogative form (Q) may be "I've operated slot machines before" (affirmative form (A)), for example.

On the other hand, when the type of response is in the affirmative form (A), a reply sentence associated with this type of response is made in the interrogative form (Q). A reply sentence created in the interrogative form (Q) may be an interrogative sentence for asking back against the contents of an utterance or an interrogative sentence for finding out a certain matter. For example, when the uttered sentence is "I like playing slot machines," for example, the type of utterance of this uttered sentence is the affirmative form (A). A reply sentence associated with the affirmative form (A) may be "Do you like playing pachinko?" (an interrogative sentence (Q) for finding out a certain matter), for example.

The reply retrieval unit 350 outputs the retrieved reply sentence as a reply sentence signal to the management unit 310. Upon receiving the reply sentence signal from the reply retrieval unit 350, the management unit 310 outputs the received reply sentence signal to the output unit 600.

The output unit 600 outputs the reply sentence retrieved at the reply retrieval unit 350. The output unit 600 may be a speaker or a display, for example. Specifically, when receiving the reply sentence from the management unit 310, the output unit 600 outputs the received reply sentence {e.g., I like Sato too} by voice, based on the reply sentence.

Figure 11:
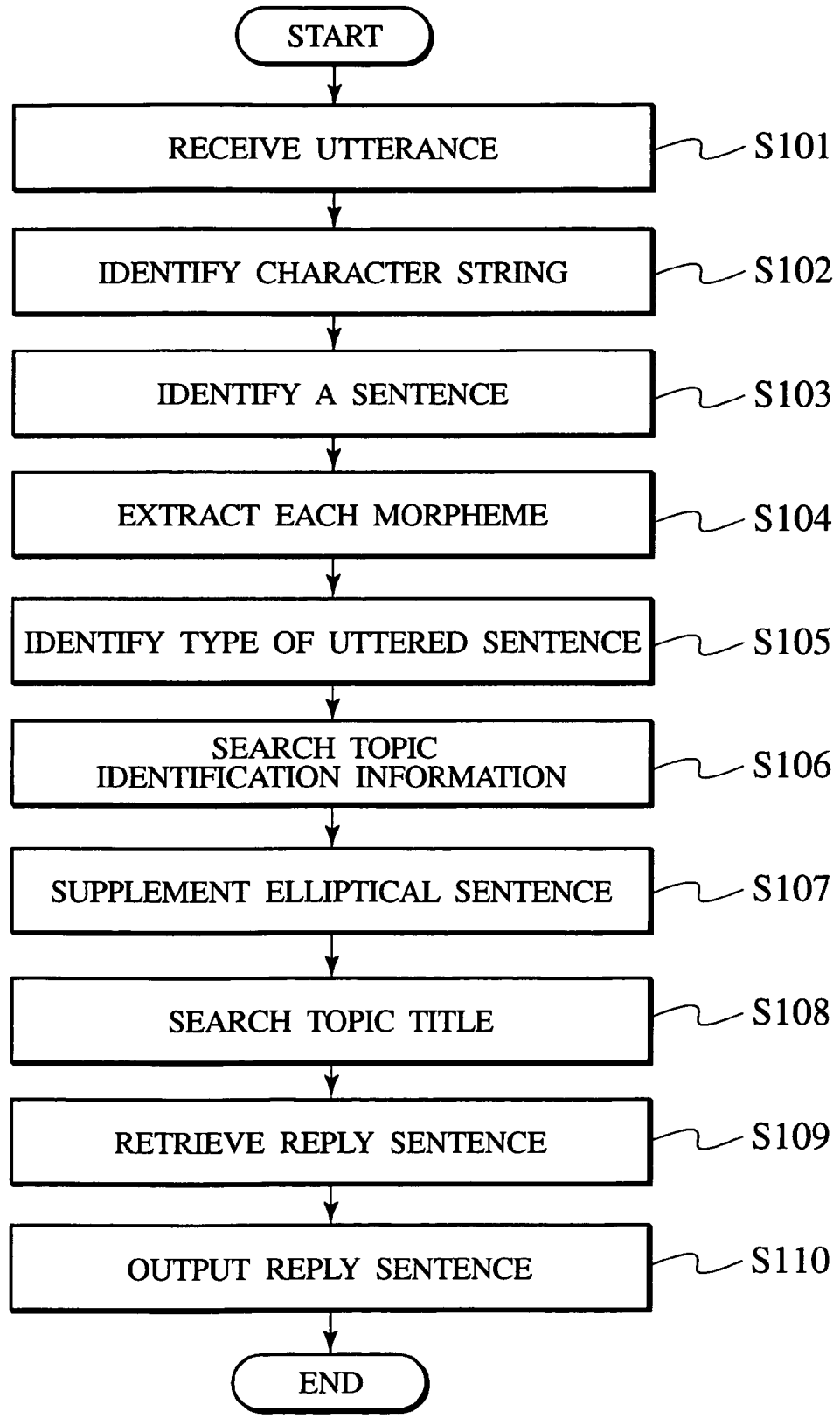
FIG. 11 is a flow diagram illustrating the steps of a conversation control method according to the first embodiment.

A conversation control method using the conversation controller 1 of the above configuration can be performed by the following steps. FIG. 11 is a flow diagram illustrating the steps of the conversation control method according to this embodiment.

First, the input unit 100 performs the step of receiving the contents of an utterance from a user (S101). Specifically, the input unit 100 receives speech constituting the contents of the utterance of the user. The input unit 100 outputs the received speech as a speech signal to the speech recognition unit 200. Alternatively, the input unit 100 may receive a character string (characters input in text format, for example) input by a user, instead of speech of a user.

Then, based on the contents of the utterance received at the input unit 100, the speech recognition unit 200 performs the step of identifying a character string corresponding to the contents of the utterance (S102). Specifically, upon receiving the speech signal from the input unit 100, the speech recognition unit 200 identifies a dictionary corresponding to the received speech signal, based on the speech signal. The speech recognition unit 200 searches a character string associated with the identified dictionary. The speech recognition unit 200 outputs the searched character string as a character string signal to the conversation control unit 300.

Then, the character string identifying unit 410 performs the step of dividing the character string identified at the speech recognition unit 200 into sentences (S103). Specifically, upon receiving the character string signal from the management unit 310, when the received character string includes a time interval exceeding a certain period, the character string identifying unit 410 divides the character string at that portion. The character string identifying unit 410 outputs the resulting character strings to the morpheme extracting unit 420 and the input type determining unit 440. When the received character string is a character string input through a keyboard, the character string identifying unit 410 divides the character string at a punctuation, a space or the like.

Thereafter, based on the character string identified at the character string identifying unit 410, the morpheme extracting unit 420 performs the step of extracting morphemes constituting minimum units of the character string as first morpheme information (S104). Specifically, upon receiving the character string from the character string identifying unit 410, the morpheme extracting unit 420 compares the received character string with a morpheme group stored in the morpheme database 430. In this embodiment, the morpheme group is composed of parts of speech.

Upon the comparison, the morpheme extracting unit 420 extracts morphemes (m1, m2, . . . ) corresponding to morphemes included in the stored morpheme group from the received character string. The morpheme extracting unit 420 outputs the extracted morphemes as first morpheme information to the topic identification information search unit 320.

Then, based on the morphemes constituting the sentence identified at the character string identifying unit 410, the input type determining unit 440 performs the step of determining the "type of the uttered sentence" (S105). Specifically, upon receiving the character string from the character string identifying unit 410, the input type determining unit 440 compares the received character string with the dictionaries stored in the utterance type database 450, based on the character string, and extracts elements relevant to the dictionaries from the character string. Upon the extraction of the elements, the input type determining unit 440 determines which "type of uttered sentences" the extracted elements belong to, based on the elements. The input type determining unit 440 outputs the determined "type of uttered sentences" (type of utterance) to the reply retrieval unit 350.

The topic identification information search unit 320 performs the step of comparing the first morpheme information extracted at the morpheme extracting unit 420 with pieces of topic identification information, and searching a piece of topic identification information corresponding to a morpheme constituting part of the first morpheme information (S106). The topic identification information search unit 320 outputs the searched piece of topic identification information and the received first morpheme information as a search command signal to the topic search unit 340. On the other hand, when the first morpheme information includes nothing in the topic identification information group, the topic identification information search unit 320 outputs the received first morpheme information as a search command signal to the elliptical sentence supplementation unit 330.

Thereafter, based on the first morpheme information received from the topic identification information search unit 320, the elliptical sentence supplementation unit 330 performs the step of adding topic identification information searched last time at the topic identification information search unit 320 to the received first morpheme information (S107). Specifically, with the first morpheme information as "W", and with the searched topic identification information as "D", the elliptical sentence supplementation unit 330 adds the topic identification information "D" to the first morpheme information "W" and outputs the resulting first morpheme information as a search command signal to the topic search unit 340.

Then, the topic search unit 340 performs the step of comparing the first morpheme information extracted at the morpheme extracting unit 420 or the first morpheme information supplemented at the elliptical sentence supplementation unit 330 with topic titles, and searches a topic title corresponding to the first morpheme information from among the topic titles (S108).

More specifically, when receiving the search command signal from the topic identification information search unit 320 and the elliptical sentence supplementation unit 330, the topic search unit 340 searches, based on the topic identification information and the first morpheme information included in the received search command signal, a topic title corresponding to the first morpheme information from among topic titles associated with the topic identification information. The topic search unit 340 outputs the searched topic title as a search result signal to the reply retrieval unit 350.

Then, based on the topic title searched at the topic search unit 340, the reply retrieval unit 350 compares the determined type of utterance of the user with types of response associated with the topic title. Upon the comparison, the reply retrieval unit 350 searches a type of response corresponding to the determined type of utterance from among the types of response (S109).

Specifically, when receiving the search result signal from the topic search unit 340 and the "type of the uttered sentence" from the input type determining unit 440, the reply retrieval unit 350 identifies, based on the "topic title" corresponding to the received search result signal and the received "type of the uttered sentence", a type of response corresponding to the "type of the uttered sentence" (e.g., DA) from a response type group associated with the "topic title".

The reply retrieval unit 350 retrieves a reply sentence associated with the identified type of response. The reply retrieval unit 350 outputs the retrieved reply sentence to the output unit 600 via the management unit 310. Upon receiving the reply sentence from the management unit 310, the output unit 600 outputs the received reply sentence (S110).

According to the present invention having the above configuration, since first morpheme information is a collection of main morphemes constituting the contents of an utterance of a user, the reply retrieval unit 350 can retrieve a reply sentence, considering the semantic content of a sentence made from the main morphemes. Consequently, the reply retrieval unit 350 can retrieve a reply sentence more appropriate to the contents of an utterance than merely searches, with the entire contents of an utterance as keywords, a reply sentence associated with the keywords.

The topic search unit 340 searches a topic title corresponding to first morpheme information, and has no need to search a topic title completely agreeing with the contents of an utterance of a user. Consequently, it becomes unnecessary for developers developing the conversation controller 1 to store all topic titles completely agreeing with first morpheme information, and the memory capacity can be reduced.

When searching a topic title close to first morpheme information, all that is necessary for the topic search unit 340 is to compare the first morpheme information with topic titles associated with "topic identification information". It is not necessary to compare the first morpheme information with "all" topic titles. As a result, the topic search unit 340 can search a topic title close to the first morpheme information in a short period of time (pinpoint search). Since the topic search unit 340 can conduct the pinpoint search, the reply retrieval unit 350 can retrieve, based on a topic title searched in a short period of time, a reply sentence associated with the topic title in a short period of time.

The reply retrieval unit 350 can search a type of response corresponding to a determined type of utterance from among different types of response associated with a topic title, and retrieve a reply sentence associated with the searched type of response. Thus, the reply retrieval unit 350 can retrieve a reply sentence suitable for the type of utterance constituting the contents of an utterance, and the reply retrieval unit 350 can make a more appropriate reply to the contents of an utterance of a user.

When the contents of an utterance of a user constitute an elliptical sentence, the elliptical sentence supplementation unit 330 can add topic identification information searched last time at the topic identification information search unit 320 to first morpheme information corresponding to the contents of the utterance. Thus, even when the contents of an utterance of a user constitute an elliptical sentence, the elliptical sentence supplementation unit 330 can supplement the elliptical sentence, using previously searched topic identification information. As a result, even when a sentence made from first morpheme information is an elliptical sentence, the elliptical sentence supplementation unit 330 can make the sentence into a proper sentence.

Based on the supplemented first morpheme information, the topic search unit 340 can search an appropriate topic title relevant to the first morpheme information. Therefore, based on the appropriate topic title searched at the topic search unit 340, the reply retrieval unit 350 can output a reply sentence appropriate to the contents of the utterance.

Finally, even when input information from a user is an elliptical sentence, the conversation controller 1 can infer what the elliptical sentence means, using a past search result without using the function of a neuronetwork, AI or the like, and also can search a more appropriate reply sentence based on the inferred semantic content. In addition, developers of the conversation controller 1 have no need to install a neuronetwork or AI, and thus the developers can build the system of the conversation controller 1 more simply in a shorter period of time.

[Modifications]

The present invention is not limited to the above embodiment, and modifications as described below can be added.

(First Modification)

Figure 12:
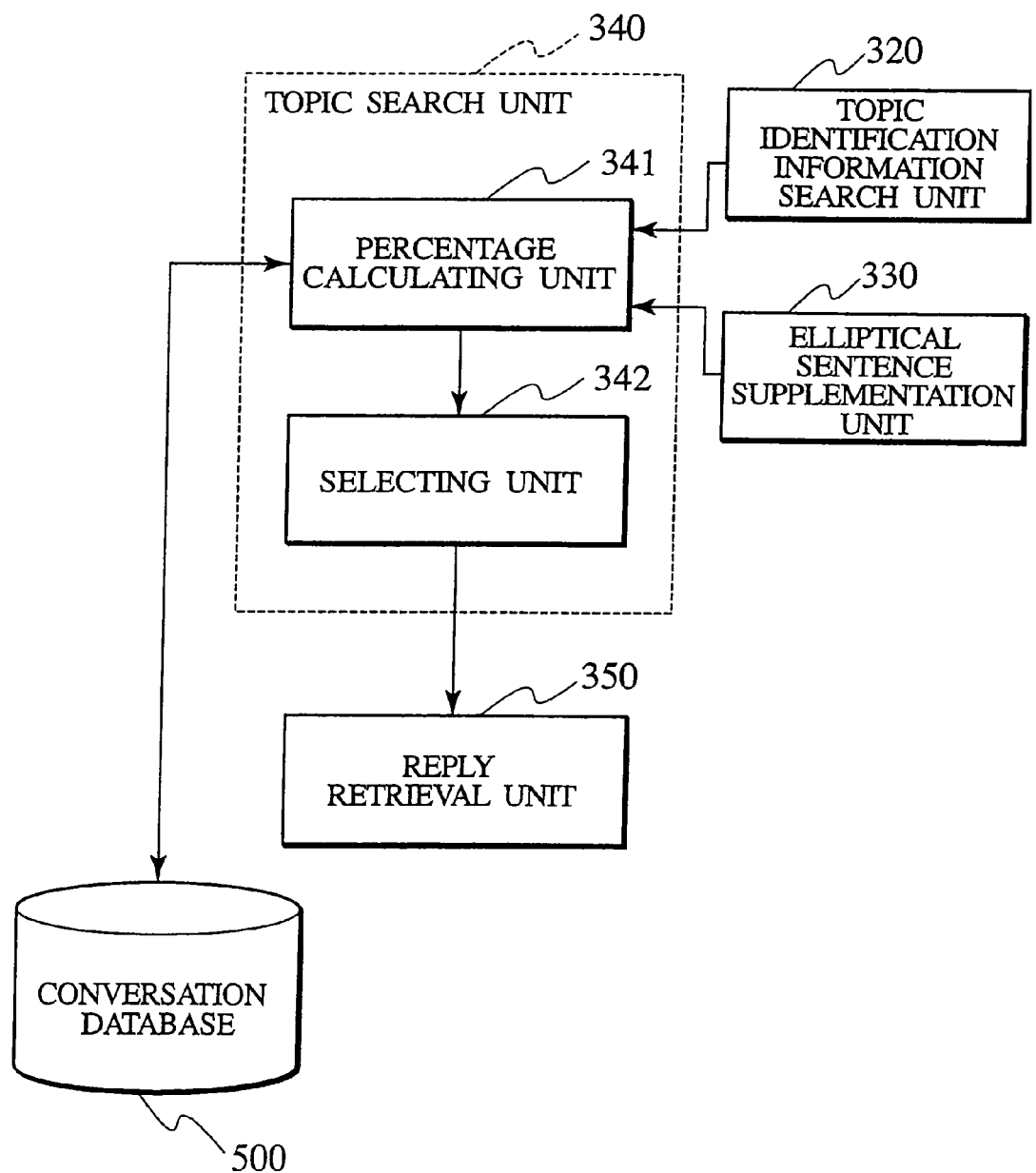
FIG. 12 is a diagram illustrating an internal configuration of a topic search unit in a first modification.

In this modification, as shown in FIG. 12, a topic search unit 340 may include a percentage calculating unit 341 and a selecting unit 342. The percentage calculating unit 341 compares first morpheme information extracted at a morpheme extracting unit 420 with topic titles, and calculates the percentage of the first morpheme information to a topic title, for every topic title.

Figure 13:
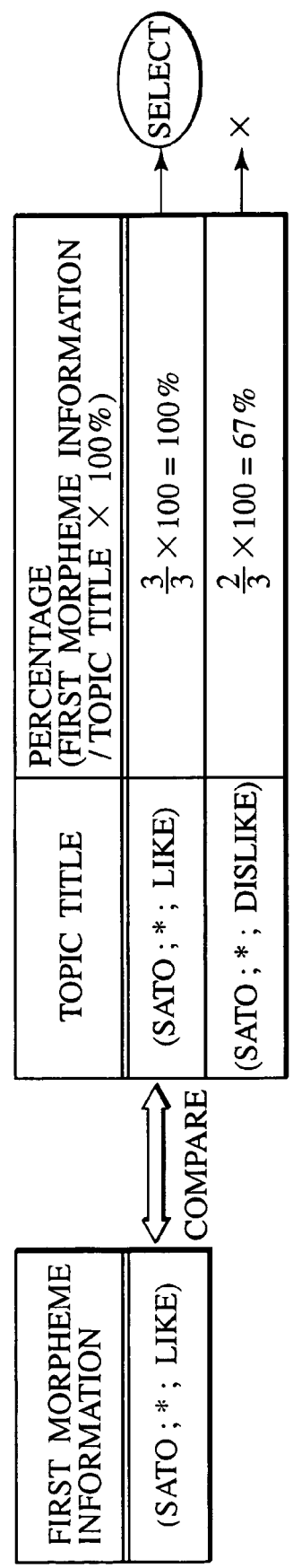
FIG. 13 is a diagram illustrating a manner in which a percentage calculating unit compares first morpheme information with a "topic title" for each "topic title" in a first modification.

As shown in FIG. 13, when first morpheme information constituting the contents of an utterance is (Sato; *; like) {I like Sato too}, for example, the percentage calculating unit 341 compares the first morpheme information (Sato; *; like) with the topic title (Sato; *; like). Upon the comparison, since they are the same, the percentage calculating unit 341 calculates that the percentage of the morphemes (Sato; *; like) constituting the first morpheme information in the topic title is 100%. The percentage calculating unit 341 performs such calculation for each topic title. The percentage calculating unit 341 outputs calculated percentages as a percentage signal to the selecting unit 342.

The selecting unit 342 selects a topic title from among the topic titles according to the greatness of the percentages calculated at the percentage calculating unit 341. Specifically, when receiving the percentage signal from the percentage calculating unit 341, the selecting unit 342 selects, from among the percentages included in the received percentage signal, a topic title of the highest percentage (Sato; *; like), for example (see FIG. 13). Based on the topic title selected at the selecting unit 342, the reply retrieval unit 350 retrieves a reply sentence associated with the topic title.

In this manner, the selecting unit 342 can search a topic title in which first morpheme information constitutes the largest percentage from among a plurality of topic titles. The selecting unit 342 can thus appropriately search a topic title having the closest relevance to first morpheme information. As a result, based on the searched topic title, the reply retrieval unit 350 can make an appropriate reply to the contents of an utterance of a user.

Since the selecting unit 342 can search a topic title most closely related to first morpheme information, developers developing a conversation controller 1 have no need to store topic titles completely agreeing with first morpheme information in a conversation database 500.

(Second Modification)

Figure 14:
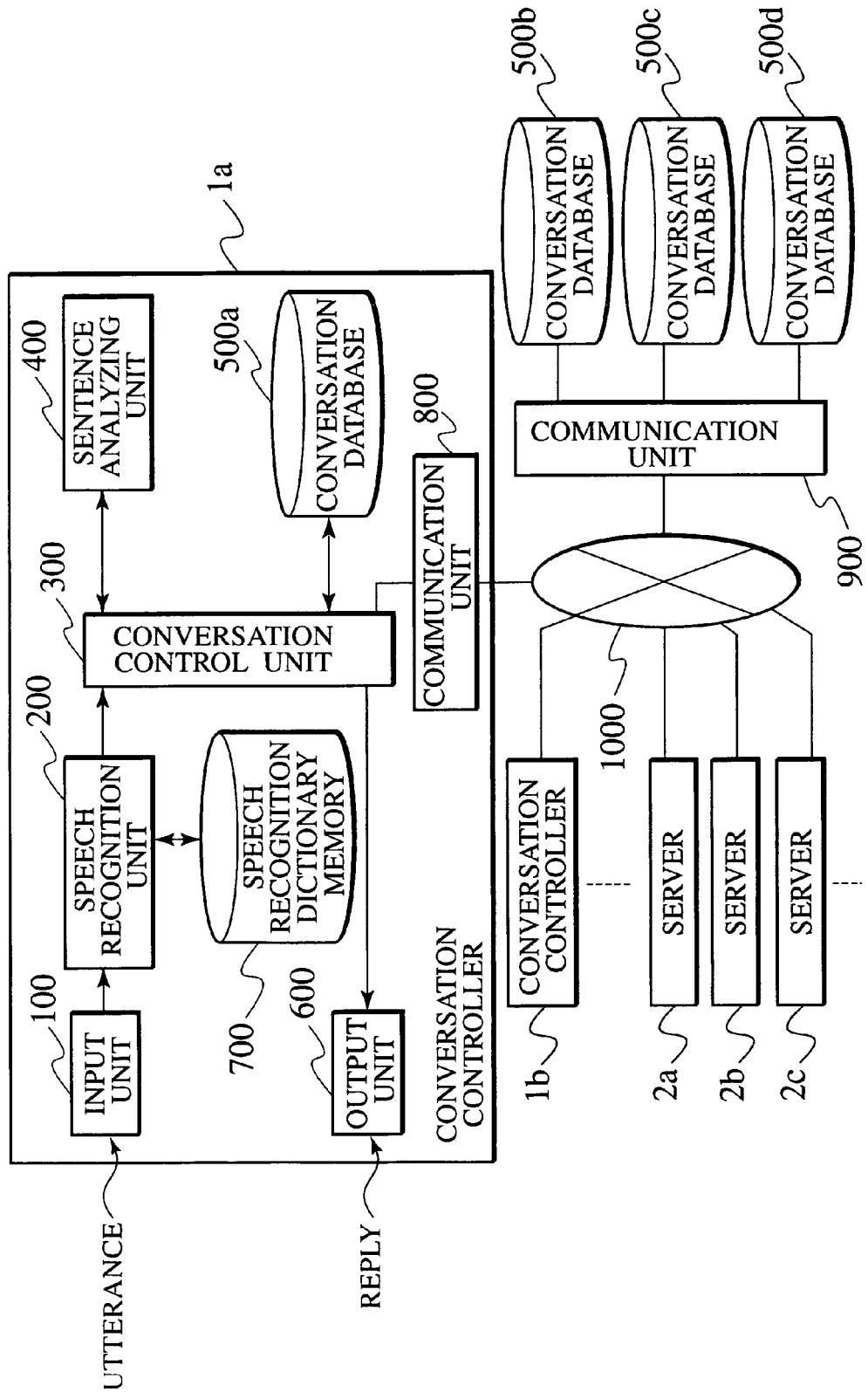
FIG. 14 is a diagram illustrating a general configuration of a conversation control system in a second modification.

As shown in FIG. 14, a conversation control system in this modification may include a communication unit 800 and a communication unit 900 connected to a communication network 1000, conversation databases 500b to 500d connected to the communication unit 900, and servers 2a to 2c. In this modification, the communication network 1000 may be the Internet, for example.

(Third Modification)

In this modification, a conversation database 500 may store pieces of element information each indicating an entire group of a plurality of morphemes, in association with the groups. A morpheme extracting unit 420 may compare morphemes extracted from a character string with the stored groups, select a group including the extracted morphemes from among the groups, and extract element information associated with the selected group as first morpheme information.

More specifically, morphemes included in a character string uttered by a user can be similar to one another in the meaning of the morphemes. For example, when element information indicating an entire group is "present", "present" includes the ideas of gifts, year-end gifts and so on (group). When a morpheme is included in "present," the morpheme extracting unit 420 replaces the morpheme with "present".

In this manner, since the morpheme extracting unit 420 can replace morphemes similar to one another with a single morpheme, developers developing a conversation controller 1 have no need to prepare topic titles even slightly similar to each piece of first morpheme information, resulting in a reduced amount of data to be stored in a memory.

(Fourth Modification)

A morpheme extracting unit 420 may store extracted first morpheme information in a conversation database 500. A topic search unit 340 may store a searched topic title in the conversation database 500. When the topic search unit 340 cannot search a topic title corresponding to first morpheme information extracted at the morpheme extracting unit 420 from among stored topic titles, an elliptical sentence supplementation unit 330 may add a morpheme constituting part of previously searched first morpheme information or topic title to the extracted first morpheme information. Based on the first morpheme information with the morpheme added at the elliptical sentence supplementation unit 330, the topic search unit 340 searches a topic title corresponding to the first morpheme information from among topic titles.

Therefore, even when the contents of an utterance consisting of first morpheme information constitute an elliptical sentence and is not clear as Japanese, the elliptical sentence supplementation unit 330 can supplement the elliptical first morpheme information using a morpheme constituting part of a previously searched piece of first morpheme information or topic title.

As a result, when the contents of an utterance constituting first morpheme information is an elliptical sentence, the elliptical sentence supplementation unit 330 can add a morpheme omitted from the first morpheme information, making the contents of the utterance consisting of the first morpheme information into correct Japanese. A reply retrieval unit 350 can thus retrieve the contents of response more appropriate to the contents of the utterance of the user.

(Fifth Modification)

Figure 15:
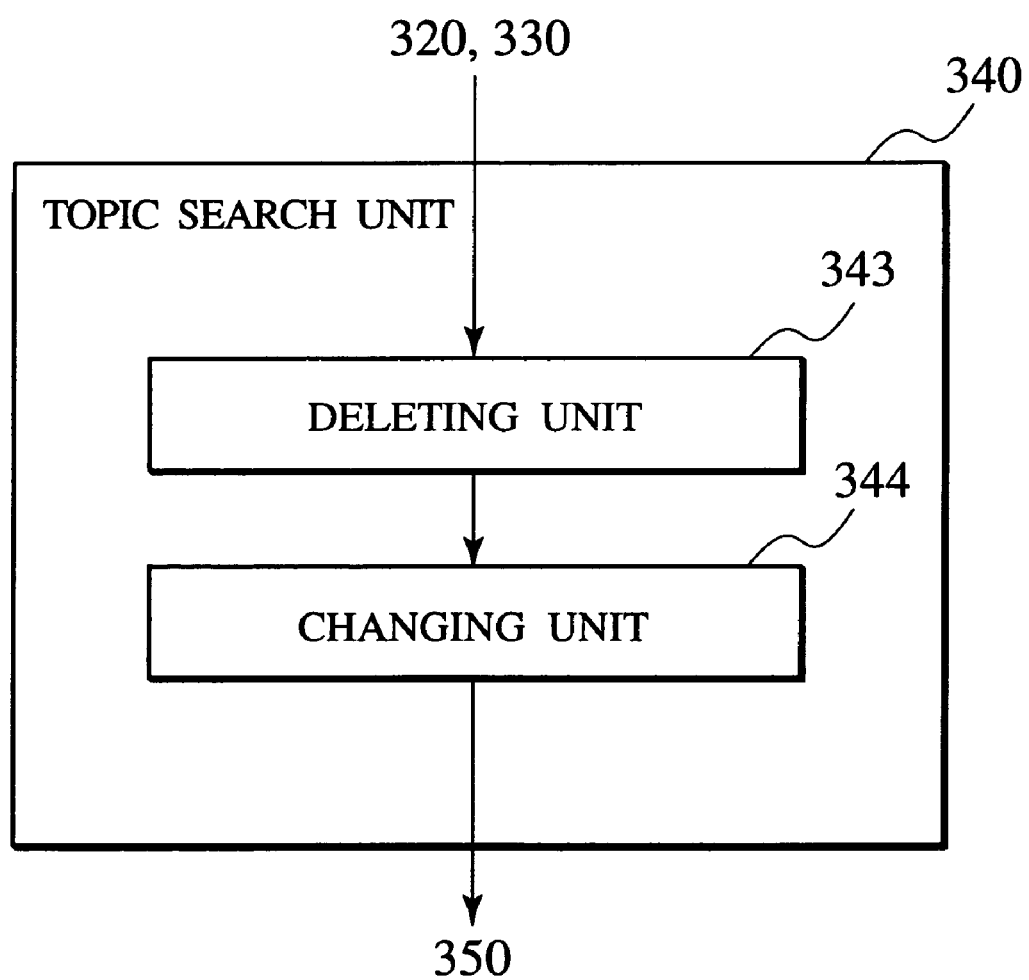
FIG. 15 is a diagram illustrating an internal structure of a topic search unit in a fifth modification.

As shown in FIG. 15, a topic search unit 340 may change a searched topic title into another topic title. The topic search unit 340 includes a deleting unit 343 and a changing unit 344. Based on a searched topic title, the deleting unit 343 deletes at least one morpheme included in the topic title (e.g., a morpheme constituting topic identification information).

More specifically, when receiving a topic search command signal from an elliptical sentence supplementation unit 330, the topic search unit 340 compares first morpheme information included in the received topic search command signal with topic titles associated with retrieved topic identification information, and searches a topic title corresponding to the first morpheme information from among the topic titles.

Based on the searched topic title, the deleting unit 343 compares the topic title with the topic identification information searched at a topic identification information search unit 320. Upon the comparison, the deleting unit 343 deletes a morpheme corresponding to the searched topic identification information from the searched topic title. The deleting unit 343 outputs the topic title resulting from the deletion of the morpheme as a deletion signal to the changing unit 344.

Based on the topic title resulting from the deletion of the morpheme at the deleting unit 343, the changing unit 344 obtains another morpheme associated with the deleted morpheme (e.g., topic identification information), and adds the obtained morpheme to the topic title.

More specifically, with topic identification information related to a reply sentence "K1" as "DK", topic identification information "D3" having relevance to (in a sibling relationship with) the reply sentence "K1" or topic identification information "D2" at that time can be expressed as "D2 U DK". Thus, a topic title "t3" resulting from the addition of the topic identification information "D3" to a topic title "t2" resulting from deletion of a morpheme can be "t2 U D" ("D" is a set of "D3", and is not an empty set).

For example, when a topic title "t1" is (A movie; *; exciting) {Is A movie exiting?}, and topic identification information "D2" searched at that time at the topic identification information search unit 320 is (A movie), the deleting unit 343 first deletes the topic identification information "D2" (A movie) from the topic title "t1" (A movie; *; exciting). A topic title (*; *; exciting) resulting from the deletion of the topic identification information "D2" is expressed as "t2" (t2=t1−D2).

When topic identification information "D3" related to the topic identification information "D2" (A movie) is "movie B", the changing unit 344 adds the topic identification information "D3" to the topic title "t2", changing the topic title "t2" into a topic title "t3" (B movie; *; exciting) {Is B movie exciting?}.

In this manner, when the contents of an utterance of a user is "Is A movie exciting?", the changing unit 344 can change topic title (A movie; *; exciting) corresponding to morphemes (A movie; *; exciting) constituting the contents of the utterance of the user into another topic title (B-movie; *; exciting) {Is B movie exciting?}.

As a result, although a reply retrieval unit 350 does not output a direct reply sentence to the contents of an utterance of a user, it can output a reply sentence related to the contents of the utterance based on a topic title changed at the changing unit 344, and therefore can retrieve a more humane reply sentence.

The changing unit 344 is not limited to the one which adds different topic identification information to a topic title from which a morpheme was deleted, and may alternatively add historical morpheme information to a topic title from which a morpheme was deleted. In this modification, the historical morpheme information means at least one morpheme constituting part of a previously searched topic title or reply sentence.

(Sixth Modification)

When a topic search unit 340 cannot search a topic title corresponding to first morpheme information from among a plurality of topic titles, a reply retrieval unit 350 may compare the first morpheme information with a plurality of reply sentences, and retrieve a reply sentence including the first morpheme information from among the reply sentences.

Consequently, even when a topic identification information search unit 320 cannot search a topic title corresponding to first morpheme information from among a plurality of topic titles, the reply retrieval unit 350 can retrieve a reply sentence including the first morpheme information from among a plurality of reply sentences. As a result, the reply retrieval unit 350 can appropriately search a topic title corresponding to first morpheme information constituting the contents of an utterance of a user.

(Seventh Modification)

Language constituting the contents of an utterance of a user, topic identification information, topic titles, reply sentences or the like is not limited to Japanese, and may be English, German, Spanish, Chinese, Korean, Russian or French, for example.

[Program]

Details described above of the conversation controller, conversation control system and conversation control method can be implemented by executing a dedicated program for using a given program language in a general-purpose computer such as a personal computer.

In this embodiment, the program language may be a language for hierarchically storing morphemes constituting topics or the like to be requested by users in a database, such as Discourse Knowledge Markup Language (DKML) developed by the inventors, extensible Markup Language (XML), or C language, for example.

The program according to this embodiment allows a general-purpose computer to implement the conversation controller and the conversation control method having functions and effects of being able to identify morphemes constituting the contents of an utterance of a user, and, based on the identified morphemes, output the most appropriate reply sentence from among a plurality of reply sentences.

Figure 16:
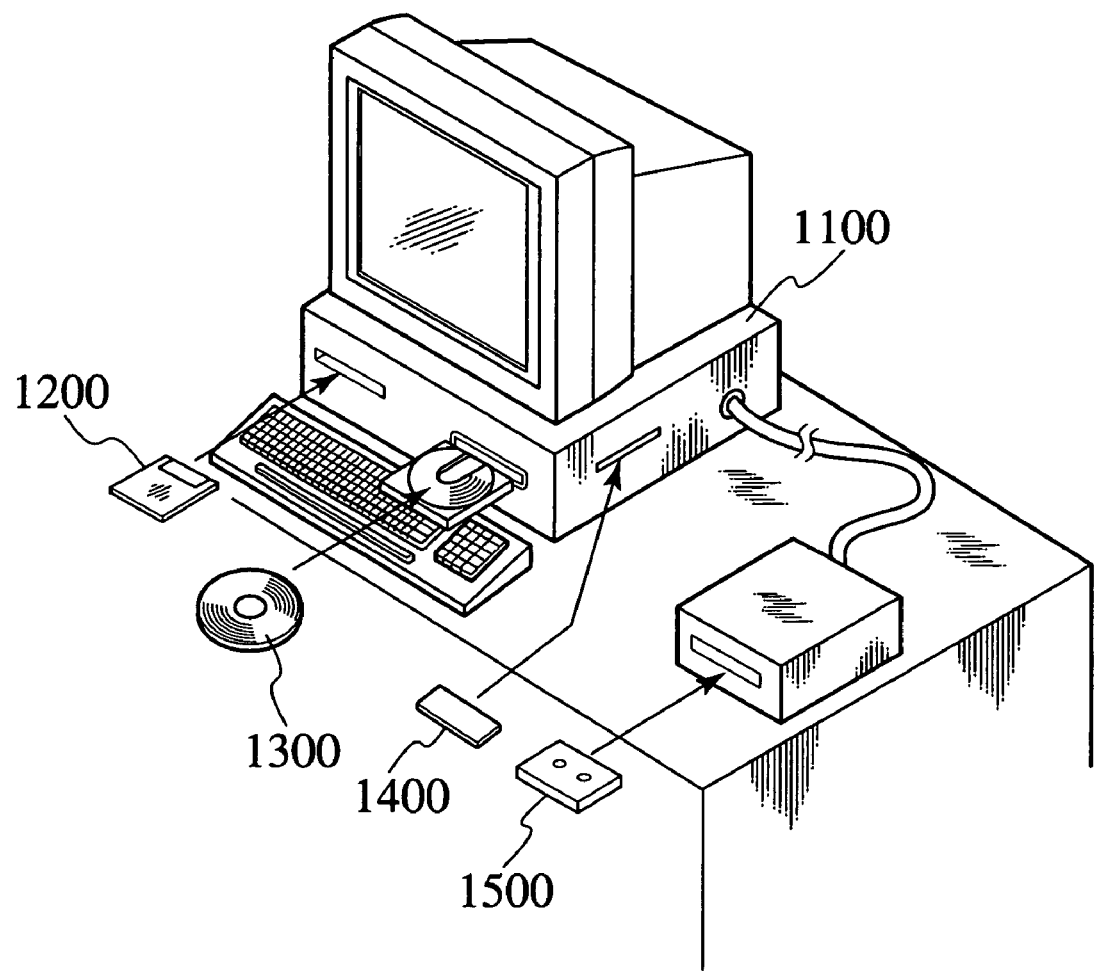
FIG. 16 is a diagram illustrating record media for storing a program in the first embodiment.

The program can be stored in a storage medium. The storage medium may be, as shown in FIG. 16, a hard disk 1100, a flexible disk 1200, a compact disc 1300, an IC chip 1400, or a cassette tape 1500, for example. With the storage medium storing the program, dealers or developers can easily store, carry and sell the program.

Second Embodiment

Figure 17:
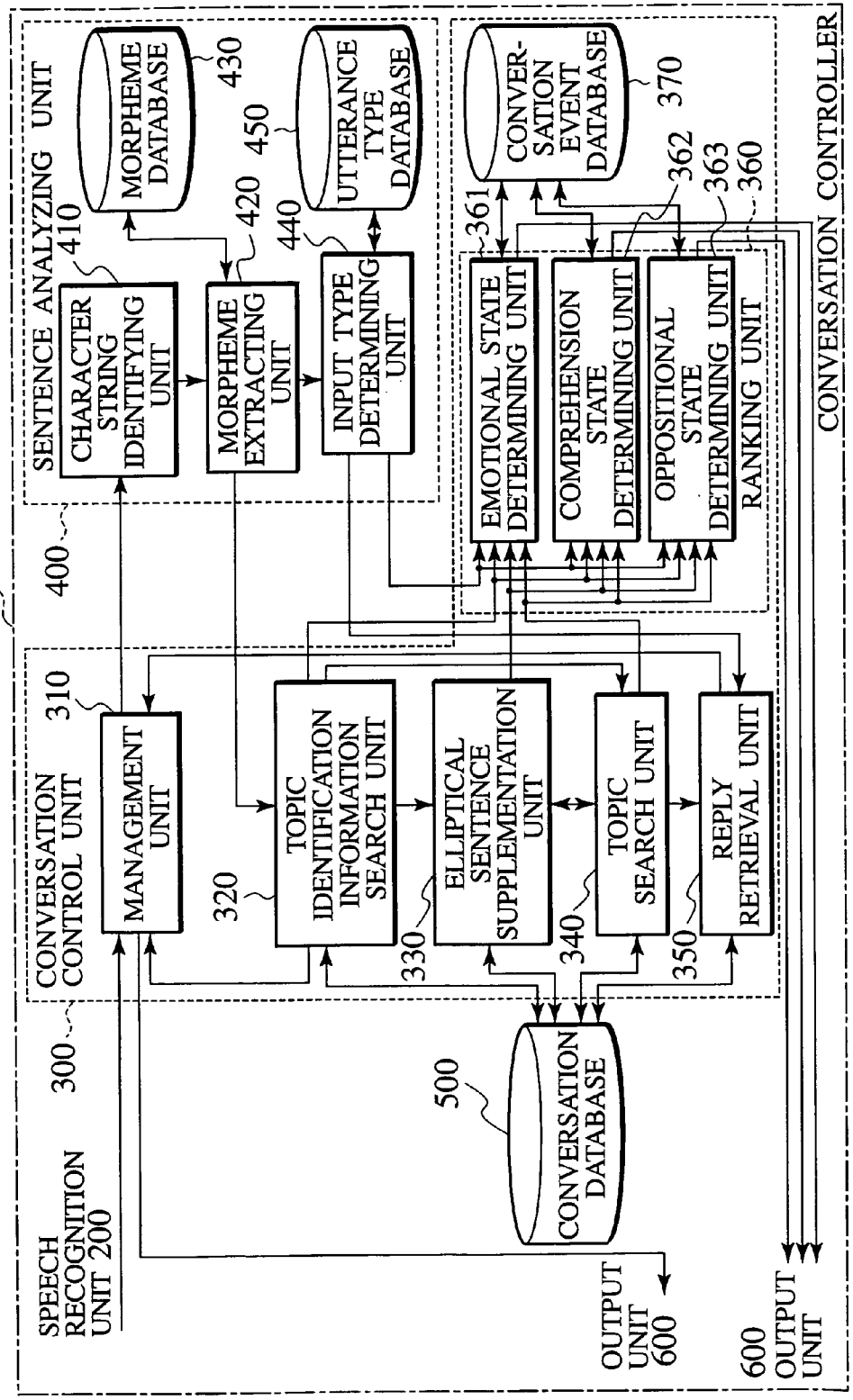
FIG. 17 is a block diagram illustrating internal structures of a conversation control unit and a sentence analyzing unit in a second embodiment.

A second embodiment of the present invention will be described with reference to the drawings. FIG. 17 illustrates the internal configuration of a conversation control system according to this embodiment. As shown in FIG. 17, a conversation controller 1 includes components almost identical to those in the first embodiment, but differs in including a ranking unit 360.

Except for the difference, the configuration is the same as that of the first embodiment and its modifications. This embodiment also has the functions and effects of the first embodiment and its modifications. In this embodiment, except for differences from the first embodiment and its modifications, description of the configuration, functions and effects will not be made.

In the first embodiment, the processing of the conversation controller 1 for retrieving the most appropriate reply sentence to the contents of an utterance of a user, based on the utterance, is described. In this embodiment, the processing of the ranking unit 360 for ranking the degree of emotion toward a user and the like based on the contents of an utterance of the user will be described. Detailed description is as follows.

The ranking unit 360 performs ranking according to the frequency of previous search of a topic title at a topic search unit 340. That is, based on the contents of an utterance input from a user, the ranking unit 360 ranks the degree of emotion toward the user and the like.

In this embodiment, as shown in FIG. 17, the ranking unit 360 includes an emotional state determining unit 361, a comprehension state determining unit 362 and an oppositional state determining unit 363. The degree of emotion means the degree of emotion of the conversation controller 1 toward the contents of an utterance. In this embodiment, the degree of emotion is determined by the emotional state determining unit 361 based on the contents of an utterance of a user.

The ranking unit 360 ranks the degree of emotion toward a user and the like, based on "conversation events" stored in a conversation event database. In this embodiment, as shown in FIG. 18, the "conversation events" include a cohesion factor showing that first morpheme information has a relevance (cohesion) to searched topic identification information, and a topic change showing that first morpheme information has no relevance to topic identification information at that time. Specifically, the cohesion factor means that the content of an utterance of a user is within a topic developed at that time. The topic change means that the content of an utterance of a user is out of a topic developed at that time.

Figure 19:
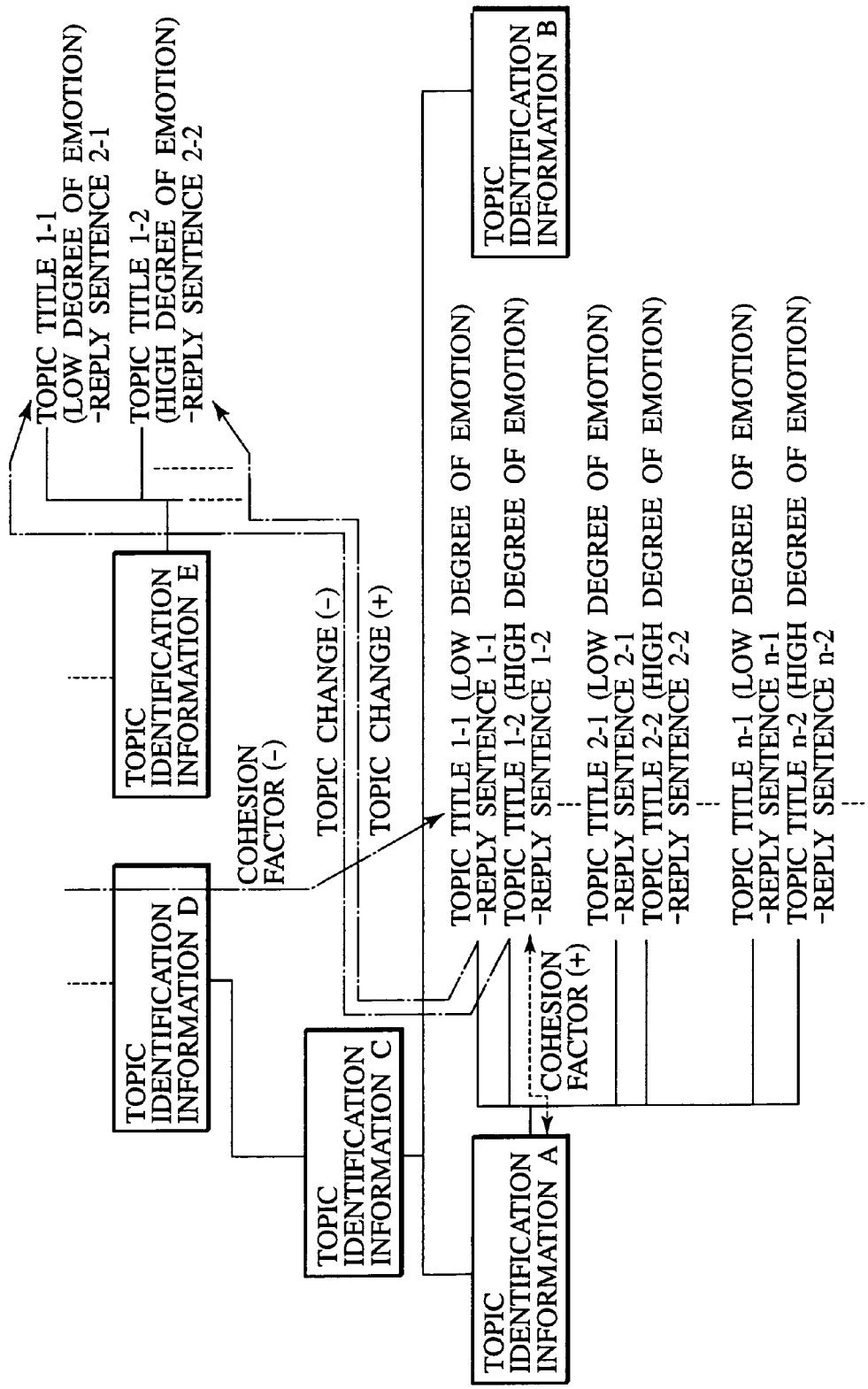
FIG. 19 is a diagram illustrating the relationship between "topic changes" and "cohesion factors" in the second embodiment.

As shown in FIG. 19, a cohesion factor (−) or (+) is determined at the ranking unit 360, based on the result of elliptical sentence supplementation processing by an elliptical sentence supplementation unit 330. Specifically, the fact that the elliptical sentence supplementation unit 330 adds previously searched topic identification information to first morpheme information means that a sentence including the first morpheme information is an elliptical sentence.

For example, when a topic at that time is (movie), a user utters a certain sentence on the topic (movie). When the topic at that time is (movie), the user may say that "The lead acts well, doesn't he" instead of saying that "The lead of the movie acts well, doesn't he.".

In this case, the user has a conversation within the topic developed at that time, and the contents of the utterance of the user has "cohesion" (the contents of the utterance is within the topic). Therefore, when the elliptical sentence supplementation unit 330 adds previously searched topic identification information to first morpheme information, the ranking unit 360 determines that there is cohesion.

Specifically, as shown in FIG. 19, cohesion factors in this embodiment include a cohesion factor (−) and a cohesion factor (+). As shown in FIG. 19, a cohesion factor (−) means that a topic title associated with "low degree of emotion" is searched at the topic search unit 340. The "low degree of emotion" means that the conversation controller 1 sets the degree of emotion toward the topic title low. This includes the case where the content of an utterance has cohesion, but the conversation controller 1 has little interest in the topic title.

As shown in FIG. 19, a cohesion factor (+) means that a topic title associated with "high degree of emotion" is searched at the topic search unit 340. The "high degree of emotion" means that the conversation controller 1 sets the degree of emotion toward the topic title high. This includes the case where the conversation controller 1 has interest in the topic title.

As shown in FIG. 19, topic changes include a topic change (−) and a topic change (+). The topic change (−) means that a topic title searched at the topic search unit 340 is changed to another topic title associated with "low degree of emotion" by subsequent search processing.

The topic change (+) means that a topic title searched at the topic search unit 340 is changed to another topic title associated with "high degree of emotion" by subsequent search processing. As shown in FIG. 19, the topic changes (−) (+) are determined at the ranking unit 360, based on the result of search of topic identification information or a topic title by the topic identification information search unit 320 or the topic search unit 340.

The "conversation events" also include a harassment factor showing that first morpheme information is more obscure information than a topic title, and an opposition factor showing that first morpheme information opposes a topic title. The harassment factor is determined at the ranking unit 360, based on the result of search of a topic title by the topic search unit 340. The opposition factor is determined at the ranking unit 360, based on the determination of the type of utterance by an input type determining unit 440.

Figure 20:
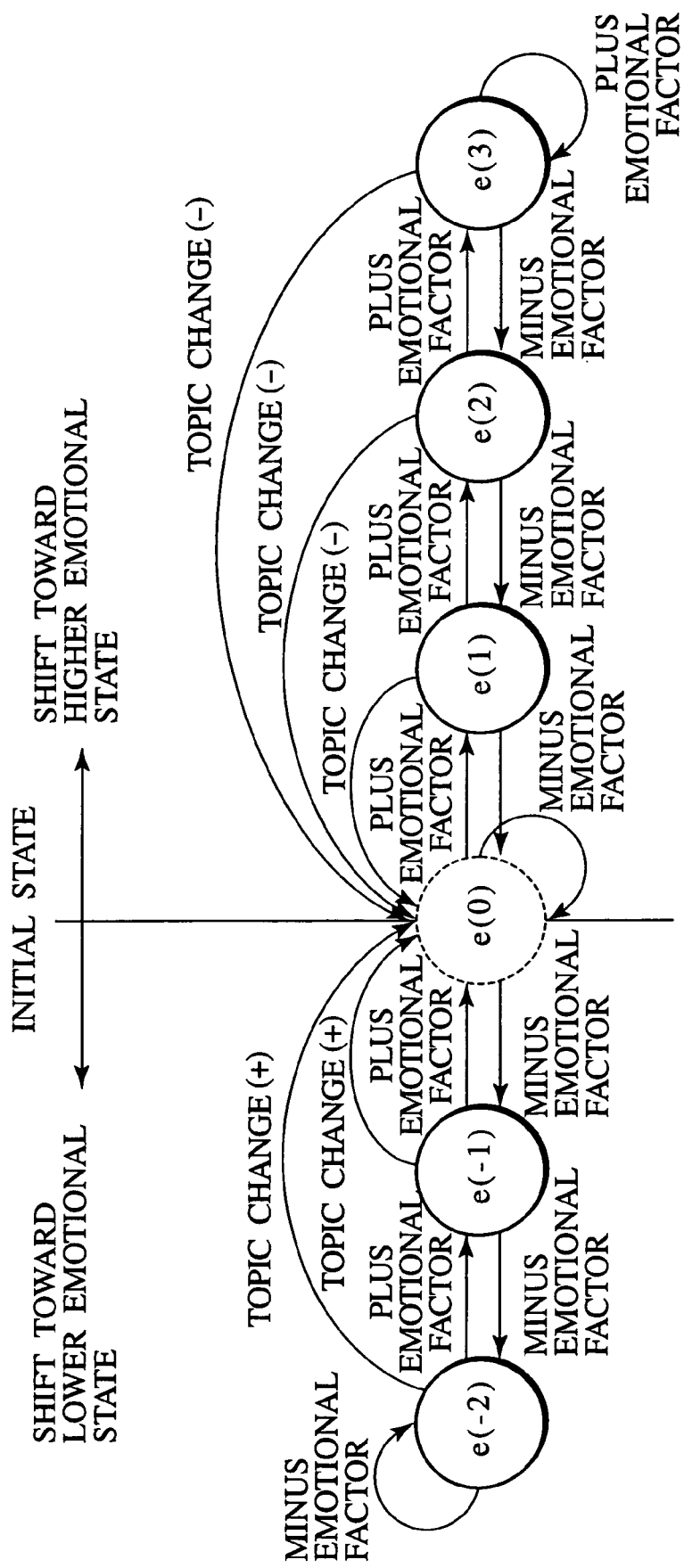
FIG. 20 is a diagram illustrating the rank of degree of emotion determined at an emotional state determining unit in the second embodiment.

The emotional state determining unit 361 ranks the degree of emotion toward a user, based on the result of a search by the topic search unit 340. In this embodiment, as shown in FIG. 20, the degree of emotion determined at the emotional state determining unit 361 can be ranked in six levels. The degree of emotion is set in such a manner that, as the numerical value increases, the degree of emotion toward a user becomes higher. In the six levels, the reference degree of emotion is e(0). The rank of the degree of emotion is not limited to six levels, and may be a different number of levels than six levels.

As shown in FIG. 20, the emotional state determining unit 361 ranks the degree of emotion, using minus emotional factors and plus emotional factors. In this embodiment, the minus emotional factors include the above-described harassment factor, opposition factor, cohesion factor (−) and topic change (−). The plus emotional factors include the cohesion factor (+) and the topic change (+).

In this diagram, in some cases, the degree of emotion shifts by two or more levels by a topic change (−) or (+). When a topic title associated with "'very' low degree of emotion" or "'very' high degree of emotion," for example, is searched, the degree of emotion at that time is shifted by two or more levels.

More specifically, when the topic search unit 340 cannot search a topic title, the emotional state determining unit 361 ranks the degree of emotion toward a user in a lower rank. That is, from the fact that a topic title cannot be searched at the topic search unit 340, it is highly likely that first morpheme information constituting the contents of an utterance is more obscure than stored topic titles.

It can be inferred that the user does not comprehensibly talk to the conversation controller 1. Therefore, the emotional state determining unit 361 determines that the first morpheme information input by the user is a minus emotional factor (harassment factor), and sets the degree of emotion toward the user lower.

On the other hand, when a topic title is searched at the topic search unit 340, the emotional state determining unit 361 ranks the degree of emotion toward a user in a higher rank. That is, the fact that a topic title is searched at the topic search unit 340 means that the conversation controller 1 can output a suitable reply sentence, using the searched topic title. It can be inferred that the user comprehensibly talks to the conversation controller 1. Thus, the emotional state determining unit 361 sets the degree of emotion toward the user higher.

The emotional state determining unit 361 also ranks the degree of emotion toward a user, based on the result of determination by the topic identification information search unit 320. In this embodiment, the topic identification information search unit 320 compares first searched first topic identification information with subsequently searched second topic identification information, and determines whether the second topic identification information is relevant to the first topic identification information.

Specifically, when the topic identification information search unit 320 determines that the second topic identification information has no relevance to the first topic identification information, the emotional state determining unit 361 ranks the degree of emotion toward the user in a lower rank. That is, the fact that the topic identification information search unit 320 determines that the second topic identification information has no relevance to the first topic identification information means that the topic identification information at that time (second topic identification information) is different from the previous topic identification information (first topic identification information). This means that the topic is changed contextually in the conversation between the conversation controller 1 and the user (topic change).

Therefore, when a topic title associated with "low degree of emotion" belonging to the second topic identification information which is different from the first topic identification information is searched, the emotional state determining unit 361 determines that the first morpheme information is a minus emotional factor (topic change (−)). Upon the determination, the emotional state determining unit 361 sets the degree of emotion toward the user lower (see FIG. 20). The topic change (−) means that topic identification information at that time is changed to another topic identification information, and first morpheme information related to the changed topic identification information is not an interesting matter for the conversation controller 1.

On the other hand, when a topic title associated with "high degree of emotion" belonging to the second topic identification information which is different from the first topic identification information is searched, the emotional state determining unit 361 determines that the first morpheme information is a plus emotional factor (topic change (+)). Upon the determination, the emotional state determining unit 361 sets the degree of emotion toward the user higher. The topic change (+) means that topic identification information at that time is changed to another topic identification information, but the first morpheme information belonging to the changed topic identification information is an interesting matter for the conversation controller 1.

When first topic identification information and second topic identification information searched at that time are substantially the same, and a topic title associated with "high degree of emotion" belonging to the second topic identification information is searched at the topic search unit 340, the emotional state determining unit 361 determines that the first morpheme information is a plus emotional factor (cohesion factor (+)), and sets the degree of emotion toward the user higher (see FIG. 20). Thus, the cohesion factor (+) means that topic identification information at that time is substantially the same as previous topic identification information, and first morpheme information belonging to the topic identification information at that time is an interesting matter for the conversation controller 1.

When the elliptical sentence supplementation unit 330 adds topic identification information to first morpheme information, the emotional state determining unit 361 ranks the degree of emotion toward the user in a higher rank. That is, from the fact that it is determined that the contents of an utterance consisting of first morpheme information is an elliptical sentence, it is possible to determine that the user is talking on a certain topic. For example, when the conversation controller 1 says {I like Sato} and a user says {I like too (elliptical sentence)}, it can be inferred that the user has a conversation within a topic at that time.

When the elliptical sentence supplementation unit 330 supplements first morpheme information, the emotional state determining unit 361 determines that topic identification information at that time is substantially the same as previous topic identification information, and determines that the first morpheme information is a cohesion factor (+), having relevance to the previous topic identification information. In this case, since the cohesion factor is (+), the emotional state determining unit 361 sets the degree of emotion toward the user higher.

When the contents of an utterance determined at the input type determining unit 440 is a negational factor such as a negational sentence, the emotional state determining unit 361 ranks the degree of emotion toward a user in a lower rank. A negational factor herein means that a user opposes to a reply sentence output from the conversation controller 1. A negational factor may be a negational sentence constituting an utterance of a user to a reply sentence of the conversation controller 1.

From the fact that the input type determining unit 440 determines that the type of utterance includes a negational factor, it can be inferred that the user is opposing the conversation controller 1. In this case, the emotional state determining unit 361 determines that the first morpheme information is a minus emotional factor (opposition factor). Upon the determination, the emotional state determining unit 361 sets the degree of emotion toward the user lower (see FIG. 20).

When no topic title corresponding to first morpheme information can be searched from among topic titles at the topic search unit 340, the comprehension state determining unit 362 determines that the contents of an utterance received from a user is harassment (a harassment factor). Upon the determination, the comprehension state determining unit 362 ranks the degree of comprehension of the contents of the utterance in a lower rank.

On the other hand, when a topic title is searched at the topic search unit 340, the comprehension state determining unit 362 determines that the contents of an utterance received from a user are easy. Upon the determination, the comprehension state determining unit 362 ranks the degree of comprehension of the contents of the utterance in a higher rank.

Figure 21:
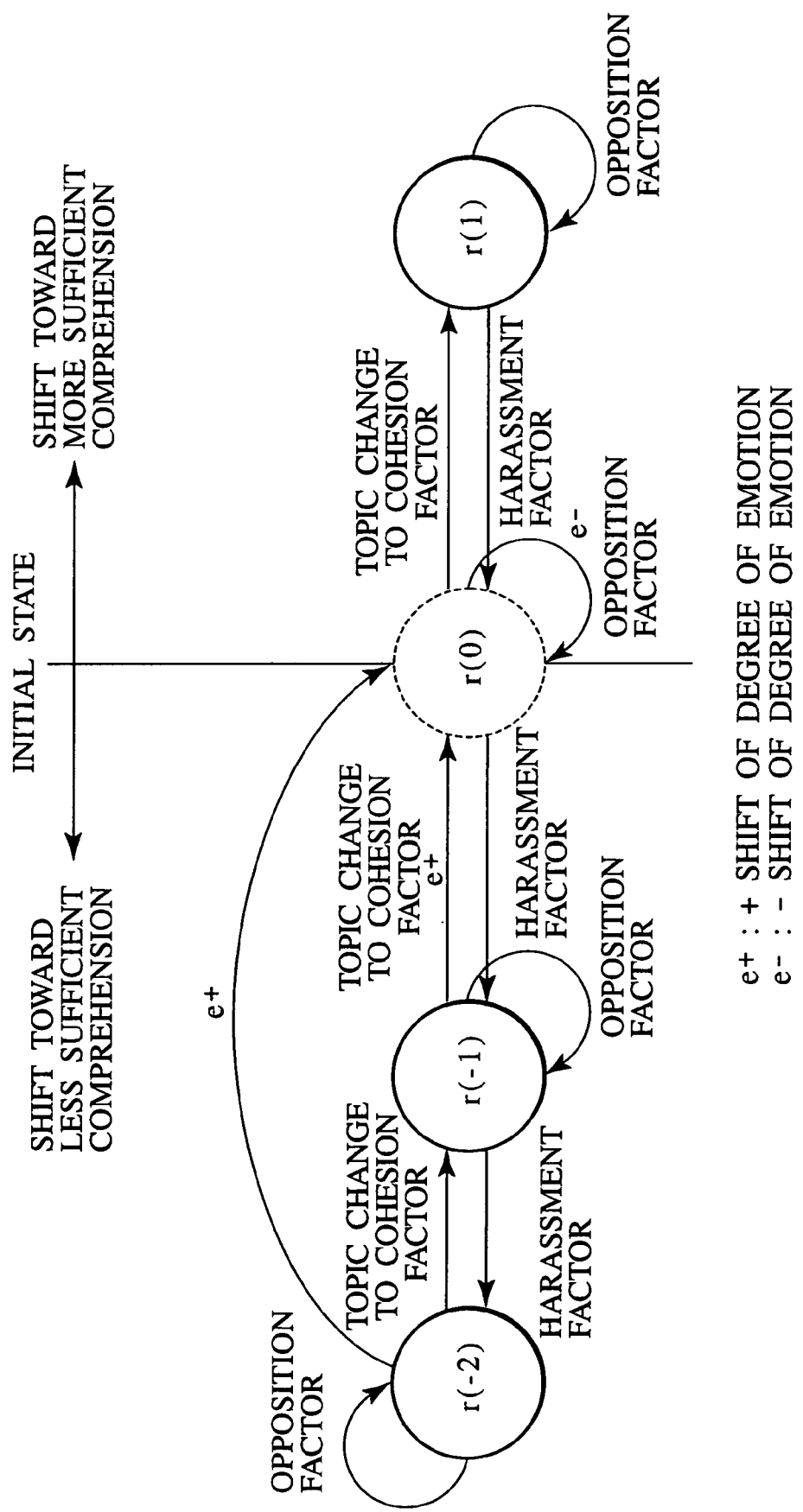
FIG. 21 is a diagram illustrating the rank of degree of comprehension determined at a comprehension state determining unit in the second embodiment.

The degree of comprehension means the degree of comprehension of the contents of an utterance. As shown in FIG. 21, the degree of comprehension can be ranked in four levels in this embodiment. When the numerical value becomes greater (in a direction from r(−2) to r(1)), it is meant that the comprehension of the contents of an utterance shifts in a more sufficient direction. On the other hand, when the numerical value becomes smaller (in a direction from r(1) to r(−2)), it is meant that the comprehension of the contents of an utterance shifts in a less sufficient direction. The rank of the degree of comprehension is not limited to four levels, and may be a different number of levels than four levels.

More specifically, when it is determined that first morpheme information is a harassment factor, the comprehension state determining unit 362 shifts the degree of comprehension lower. On the other hand, when it is determined that first morpheme information is a factor to shift to a cohesion factor, the comprehension state determining unit 362 shifts the degree of comprehension higher.

When the comprehension state determining unit 362 determines that first morpheme information is an opposition factor, the first morpheme information has no influence on the comprehension of the contents of the utterance. Thus, the comprehension state determining unit 362 maintains the rank of degree of comprehension as it is (see FIG. 21).

When the degree of emotion shifts in a plus direction, the comprehension state determining unit 362 shifts the rank of degree of comprehension to a higher rank (see "e+" in FIG. 21). A harassment factor, cohesion factor, topic change and opposition factor are identical to those described in the section on the emotional state determining unit 361, and will not be described here.

When the contents of an utterance determined at the input type determining unit 440 constitute a negational factor (or an opposition factor) such as a negational sentence, the oppositional state determining unit 363 ranks the degree of opposition to the user in a lower rank. On the other hand, when the contents of an utterance determined at the input type determining unit 440 do not constitute a negational factor, the oppositional state determining unit 363 ranks the degree of opposition to the user in a higher rank.

Figure 22:
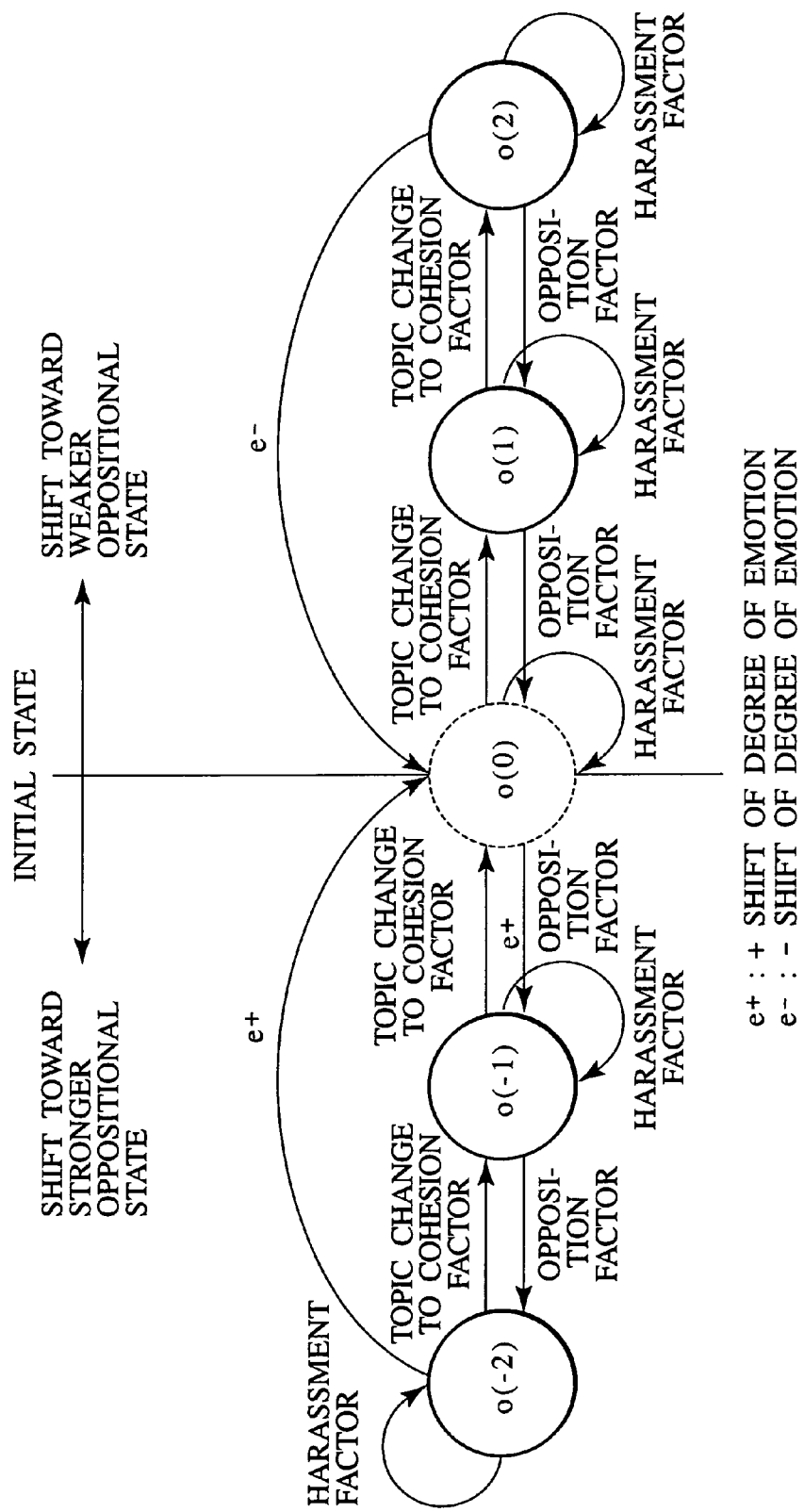
FIG. 22 is a diagram illustrating the rank of degree of opposition determined at an oppositional state determining unit in the second embodiment.

The degree of opposition herein means the degree of opposition of the conversation controller 1 to a user. As shown in FIG. 22, the degree of opposition can be ranked in five levels in this embodiment. As the numerical value becomes greater, it is meant that the degree of opposition to a user becomes weaker. On the other hand, as the numerical value becomes smaller, it is meant that the degree of opposition to a user becomes stronger. The rank of the degree of opposition is not limited to five levels, and may be a different number of levels than five levels.

More specifically, when it is determined that first morpheme information is an opposition factor, the oppositional state determining unit 363 shifts the degree of opposition lower. When it is determined that first morpheme information is not an opposition factor but a factor of topic change to a cohesion factor, the oppositional state determining unit 363 shifts the degree of opposition higher.

When the degree of emotion is set higher at the emotional state determining unit 361, the oppositional state determining unit 363 can set the degree of opposition higher (see "e+" in FIG. 22). On the other hand, when the degree of emotion is set lower at the emotional state determining unit 361, the oppositional state determining unit 363 can set the degree of opposition lower. When first morpheme information is a harassment factor, the oppositional state determining unit 363 maintains the rank of degree of opposition as it is because the first morpheme information does not oppose to a reply sentence (see FIG. 22).

The emotional state determining unit 361, the comprehension state determining unit 362 or the oppositional state determining unit 363 outputs the determined degree of emotion, degree of comprehension or degree of opposition to the output unit 600, respectively. The output unit causes the received degree of emotion, degree of comprehension or degree of opposition to be displayed, for example.

Figure 23:
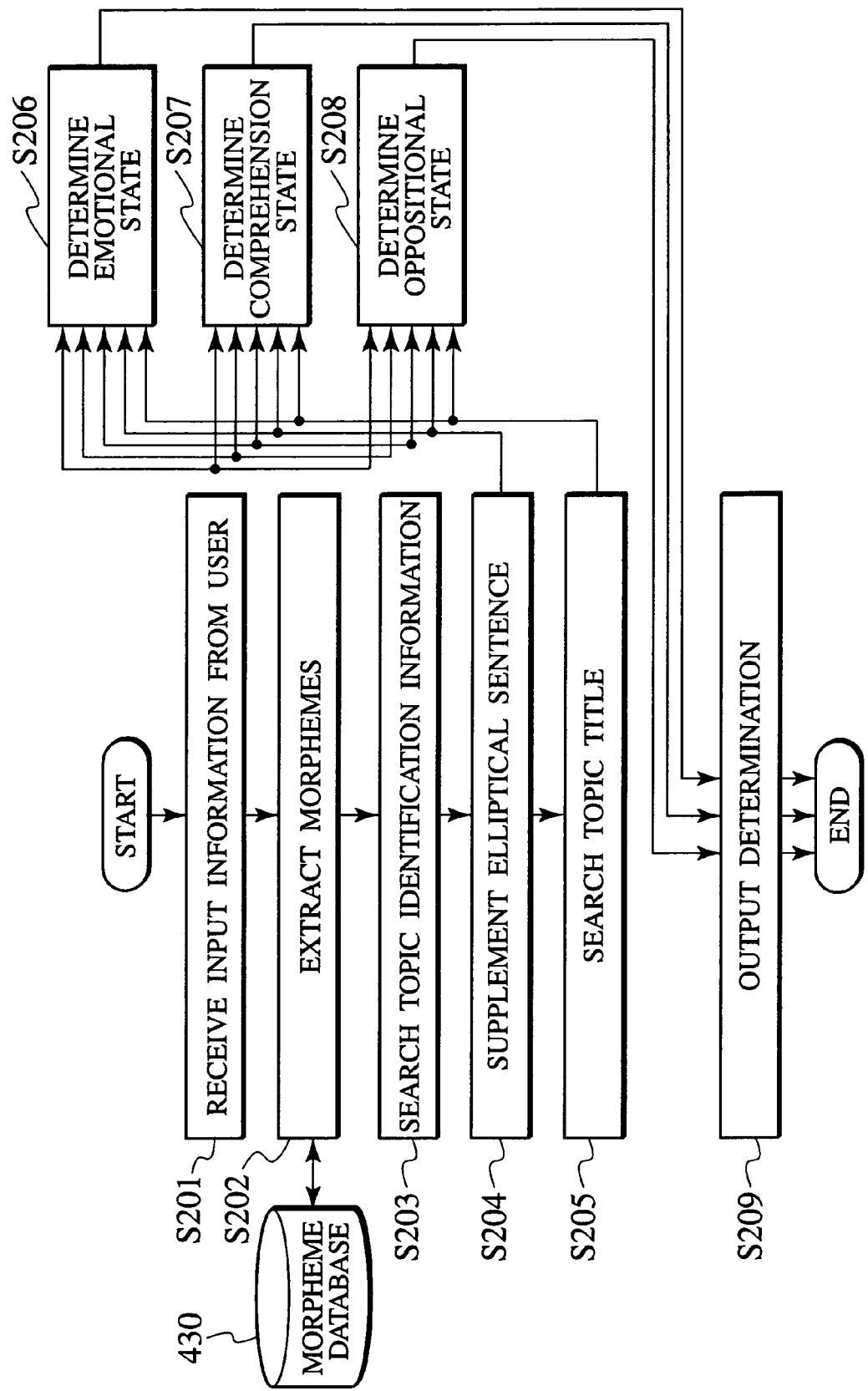
FIG. 23 is a flow diagram illustrating the steps of a conversation control method according to the second embodiment.

A conversation control method using the conversation control system having the above configuration can be implemented by the following steps. FIG. 23 is a flow diagram illustrating the steps of a conversation control method according to this embodiment.

As shown in FIG. 23, first, the input unit 100 performs the step of receiving the contents of an utterance input from a user (S201). Then, the morpheme extracting unit 420 performs the step of extracting morphemes constituting the contents of the utterance received at the input unit 100, based on the contents of the utterance (S202).

Thereafter, the topic identification information search unit 320 performs the step of comparing first morpheme information extracted at the morpheme extracting unit 420 with pieces of topic identification information, and searching a piece of topic identification information corresponding to a morpheme constituting part of the first morpheme information from among the pieces of topic identification information (S203). When the contents of the utterance constituting the first morpheme information is an elliptical sentence, the elliptical sentence supplementation unit 330 performs the step of adding topic identification information to the first morpheme information (S204).

Then, based on the identified first morpheme information or the first morpheme information to which a morpheme was added, the topic search unit 340 performs the step of comparing the first morpheme information with a plurality of topic titles, and searching a topic title including the first morpheme information from among the topic titles (S205). Specific processing in the above S201 to S205 is the same as that described in the first embodiment and will not be described in detail here.

Then, based on the result of the search by the topic identification information search unit 320, the elliptical sentence supplementation unit 330 or the topic search unit 340, the emotional state determining unit 361 performs the step of ranking the degree of emotion toward the user (S206). Specifically, when no topic title corresponding to the first morpheme information can be searched at the topic search unit 340, the emotional state determining unit 361 ranks the degree of emotion toward the user in a lower rank. On the other hand, when a topic title corresponding to the first morpheme information is searched at the topic search unit 340, the emotional state determining unit 361 ranks the degree of emotion toward the user in a higher rank.

When the topic identification information search unit 320 determines that the topic identification information at that time has no relevance to topic identification information searched last time, the emotional state determining unit 361 ranks the degree of emotion toward the user in a lower rank. On the other hand, when the topic identification information search unit 320 determines that the topic identification information at that time has relevance to topic identification information searched last time, the emotional state determining unit 361 ranks the degree of emotion toward the user in a higher rank.

When topic identification information is added to the first morpheme information at the elliptical sentence supplementation unit 330, the emotional state determining unit 361 ranks the degree of emotion toward the user in a higher rank. When the contents of the utterance determined at the input type determining unit 440 constitute a negational factor such as a negational sentence, the emotional state determining unit 361 ranks the degree of emotion toward the user in a lower rank.

Then, when no topic title corresponding to the first morpheme information can be searched at the topic search unit 340, the comprehension state determining unit 362 determines that the contents of the utterance received from the user are obscure. Upon the determination, the comprehension state determining unit 352 ranks the degree of comprehension of the contents of the utterance in a lower rank (S207).

Then, when the contents of the utterance determined at the input type determining unit 440 constitute a negational factor such as a negational sentence, the oppositional state determining unit 363 ranks the degree of opposition in a higher rank (S208). When the contents of the utterance determined at the input type determining unit 440 do not constitute a negational factor such as a negational sentence, the oppositional state determining unit 363 ranks the degree of opposition in a lower rank.

Thereafter, the emotional state determining unit 361, the comprehension state determining unit 362 or the oppositional state determining unit 363 outputs to the output unit 600 the determined degree of emotion, degree of comprehension or degree of opposition, respectively. The output unit outputs the received degree of emotion, degree of comprehension or degree of opposition (S209).

According to the present invention in this embodiment, the emotional state determining unit 361 can easily rank the degree of emotion toward a user based on the result of a search by the topic identification information search unit 320 or the like. As a result, the conversation controller can easily determine the degree of emotion using the search result, and therefore developers do not need to develop a complicated algorism for allowing the conversation controller to calculate the degree of emotion toward a user and the like, or a neural network or the like.

When topic identification information at that time has no relevance to topic identification information searched last time, the emotional state determining unit 361 can determine that the contents of an utterance at that time are completely different from the contents of a previous utterance. This means that the user has made an incoherent utterance about a topic. In this case, the emotional state determining unit 361 can set the degree of emotion toward the user worse.

On the other hand, when topic identification information at that time has relevance to topic identification information searched last time, the emotional state determining unit 361 can determine that the contents of an utterance at that time have relevance to the contents of a past utterance. This means that the user has made a coherent utterance about a topic. In this case, the emotional state determining unit 361 can set the degree of emotion toward the user better.

When topic identification information is added to first morpheme information at the elliptical sentence supplementation unit 330, the emotional state determining unit 361 can determine that the contents of an utterance including the first morpheme information constitute an elliptical sentence. This means that the user has made an utterance on a topic of a previous utterance.

Thus, when it is determined that a sentence composed of first morpheme information is an elliptical sentence, the emotional state determining unit 361 can determine that the user has input the contents of an utterance on previously searched topic identification information (topic). In this case, since the user has input a coherent thing on the topic, the emotional state determining unit 361 can set the degree of emotion toward the user better.

When no topic title including the first morpheme information can be searched at the topic search unit 340, it is meant that no topic title relevant to the first morpheme information is stored in the conversation data base 500. In this case, the comprehension state determining unit 362 can determine that the user has input an incomprehensible thing on a topic. Upon the determination, the comprehension state determining unit 362 can rank the degree of comprehension of the contents of the utterance in a lower rank.

When a topic title relevant to first morpheme information can be searched at the topic search unit 340, the comprehension state determining unit 362 can determine that the user has input a comprehensible thing on a topic. Upon the determination, the comprehension state determining unit 362 can rank the degree of comprehension of the contents of the utterance in a higher rank.

Third Embodiment

Figure 24:
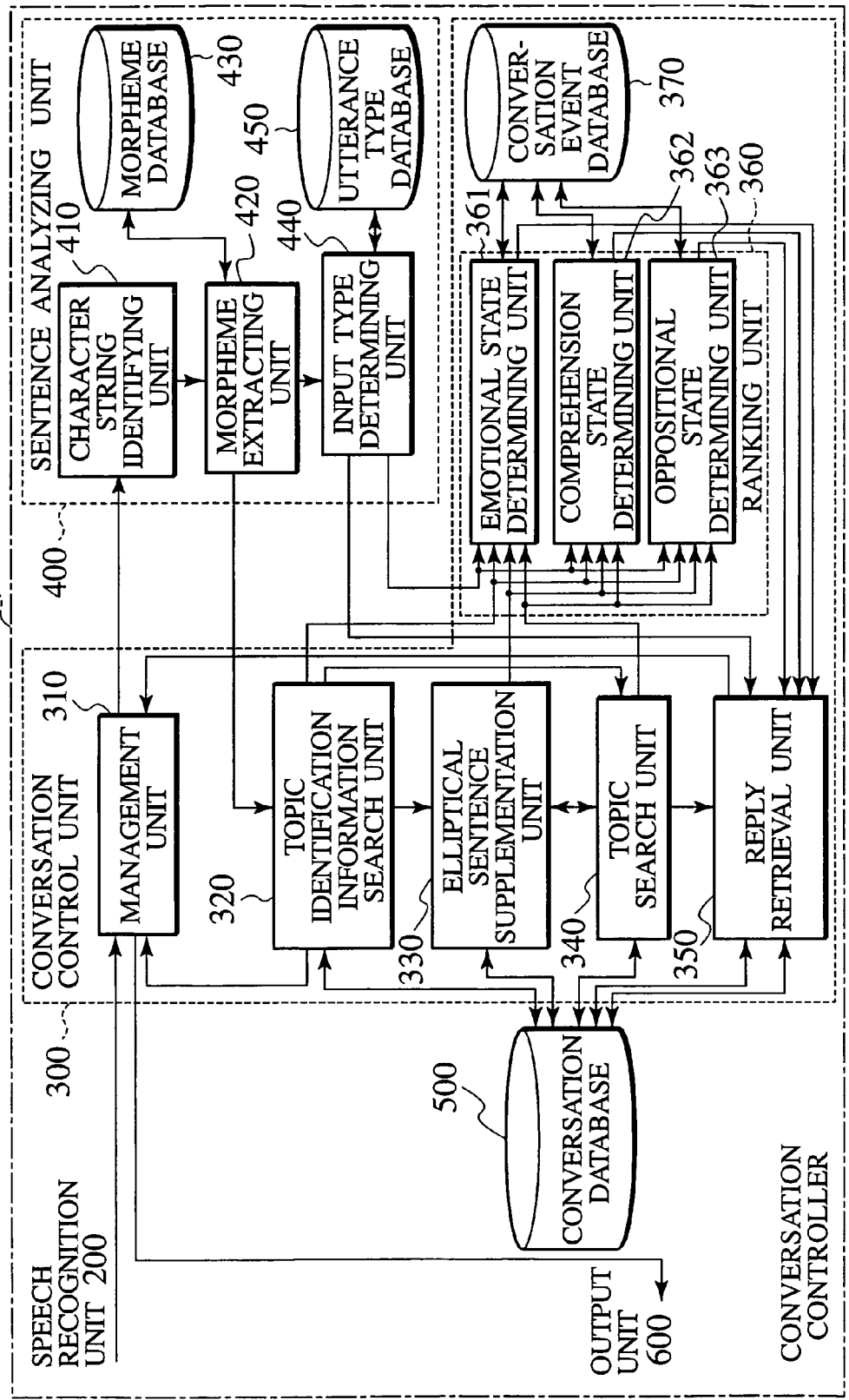
FIG. 24 is a block diagram illustrating internal structures of a conversation control unit and a sentence analyzing unit in a third embodiment.

A third embodiment of the present invention will be described with reference to the drawings. FIG. 24 illustrates the internal configuration of a conversation control system according to this embodiment. As shown in FIG. 24, the conversation control system has substantially the same internal configuration as in the second embodiment. The conversation control system in this embodiment is different from the first embodiment in that the function of a reply retrieval unit 350 is different. Except for the difference, the configuration thereof is the same as in the first embodiment, the modifications of the first embodiment and the second embodiment. No description will be made thereof other than the difference.

In the second embodiment, the conversation controller 1 performs the processing of ranking the degree of emotion toward a user and the like, based on the contents of an utterance of the user. In this embodiment, a conversation controller 1, after performing the ranking, searches an appropriate reply sentence to the contents of an utterance of a user, according to the greatness of the ranked degree of emotion and the like. Detailed description is as follows.

Based on a topic title searched at a topic search unit 340, a reply retrieval unit 350 compares different types of response associated with the topic title with the type of utterance determined at an input type determining unit 440, and searches a type of response corresponding to the type of utterance from among the different types of response. Details of the processing are the same as those described with the "reply retrieval unit 350" in the first embodiment.

A topic title is associated with a plurality of reply sentences to a user. The reply sentences are associated with priority levels, respectively, to be selected as a reply sentence to the contents of an utterance (see FIG. 25). The topic titles and the reply sentences are stored in a conversation database 500.

The reply sentences have different contents according to the greatness of the respective priority levels associated with the reply sentences. Preferably, as a priority level associated with a reply sentence is higher, the contents of the reply sentence agree more in stages with the contents of an utterance of a user.

As shown in FIG. 26, when a reply sentence 1-4 associated with priority level 0 is (I think the appearance of horses is ordinary), for example, a reply sentence 1-1 associated with priority level 3 which is greater than priority level 0 can be (Horses are really energetic and beautiful, aren't they) to have contents which agree more with the contents of an utterance of a user.

More specifically, based on a plurality of reply sentences associated with a topic title searched at the topic search unit 340, the reply retrieval unit 350 compares priority levels associated with the reply sentences with a rank determined at a ranking unit 360. Alternatively, as shown in FIG. 25, based on different types of response searched at the topic search unit 340, the reply retrieval unit 350 compares priority levels associated with the types of response with a rank determined at the ranking unit 360.

Upon the comparison, the reply retrieval unit 350 identifies a priority level corresponding to the determined rank from among the priority levels. The reply retrieval unit 350 retrieves a reply sentence associated with the identified priority level (see FIG. 25). The rank is determined at the ranking unit 360 described in the second embodiment. Detailed processing of the ranking is the same as the processing of the ranking unit 360 in the second embodiment, and will not be described in detail here.

As shown in FIG. 25, when a topic title corresponding to first morpheme information is (horse; *; like?) {Do you like horses?} and the type of utterance determined at the input type determining unit 440 is (DQ), for example, the reply retrieval unit 350 identifies the type of response (DQ) corresponding to the type of utterance (DQ) from among different types of response associated with the topic title (horse; *; like?).

Upon identifying the type of response (DQ), the reply retrieval unit 350 compares priority levels 3, 2, . . . associated with the identified type of response (DQ) with the rank determined at the ranking unit 360 (e.g., 3). When the rank is 3, the reply retrieval unit 350 identifies priority level 3 corresponding to rank 3.

Upon identifying priority level 3, the reply retrieval unit 350 retrieves a reply sentence 1-1 (Horses are energetic and good, aren't they) associated with identified priority level 3. The reply retrieval unit 350 outputs the retrieved reply sentence 1-1 to the output unit 600 via a management unit 310.

Figure 27:
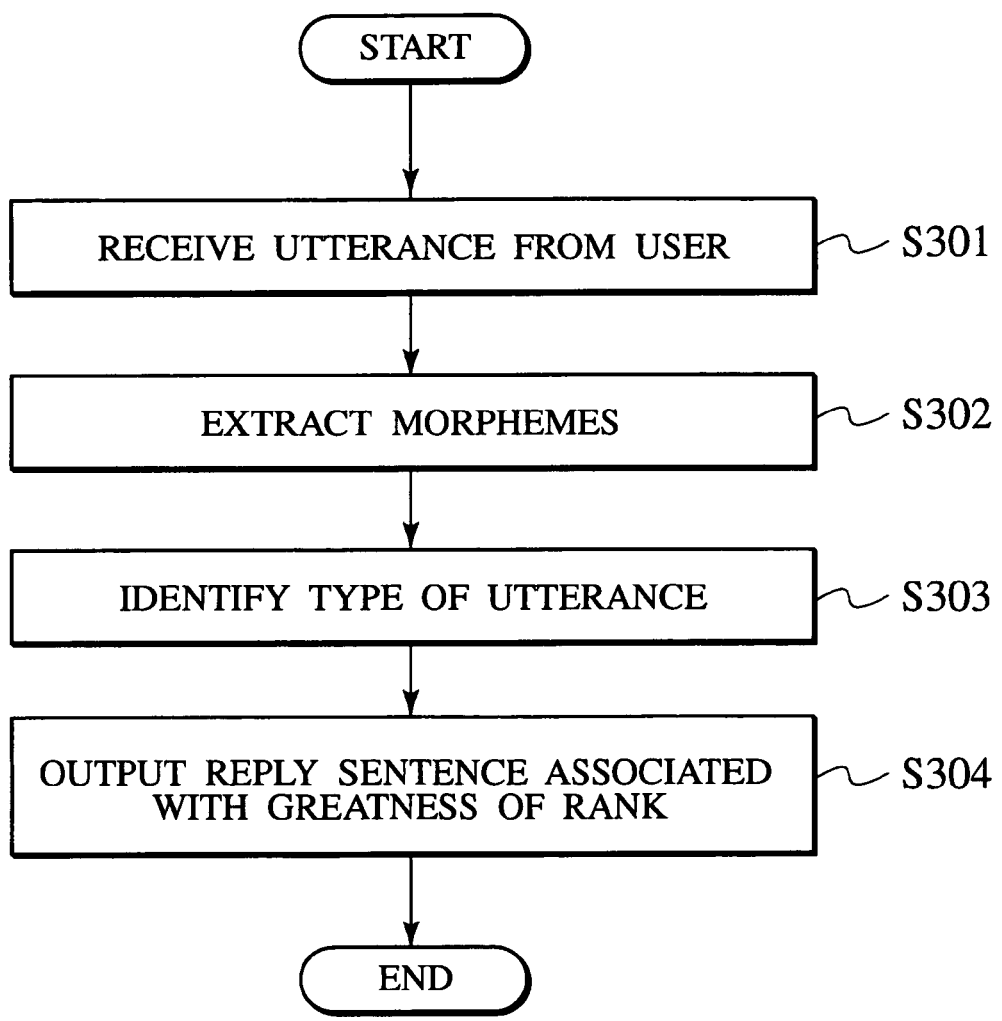
FIG. 27 is a flow diagram illustrating the steps of a conversation control method according to the third embodiment.

A conversation control method using the conversation control system having the above configuration can be implemented by the following steps. FIG. 27 illustrates a flow for the conversation controller 1 to output a reply sentence based on the greatness of rank determined at the ranking unit 360. Processing from S301 to S303 is the same as the above-described processing from S101 to S104, and will not be described in detail here.

As shown in FIG. 27, the reply retrieval unit 350 performs the step of outputting a reply sentence associated with the rank (S304). Specifically, based on a topic title searched at the topic search unit 340, the reply retrieval unit 350 compares priority levels associated with the topic title with the greatness of the rank determined at the ranking unit 360.

Upon the comparison, the reply retrieval unit 350 identifies the priority level corresponding to the greatness of the rank from among the priority levels. Based on the identified priority level, the reply retrieval unit 350 retrieves a reply sentence associated with the priority level. The reply retrieval unit 350 outputs the retrieved reply sentence.

According to the present invention in this embodiment having the above configuration, the reply retrieval unit 350 can identify the priority level corresponding to the greatness of rank determined at the ranking unit 360 from among different priority levels associated with a searched topic title, and retrieve a reply sentence associated with the identified priority level. As a result, when the greatness of rank determined at the ranking unit 360 is the degree of emotion toward the user or the like, the reply retrieval unit 350 can retrieve a suitable reply sentence according to the greatness of the degree of emotion or the like.

When interesting reply sentences for a user are prepared according to the greatness of priority levels, the reply retrieval unit 350 can retrieve a reply sentence especially interesting for a user when the rank determined at the ranking unit 360 is great.

As a result, in order to obtain information interesting for a user, the user has to utter certain contents of utterance to avoid determination of a lower rank at the ranking unit 360. Therefore, the user can feel as if he or she made conversation with another user, paying attention to the user.

[Modifications]

The present invention is not limited to the above embodiment, and can be modified as described below.

(First Modification)

Developers can determine a reply sentence associated with a priority level or a type of response at will, according to the priority level or the type of response. A reply sentence associated with a priority level or a type of response is retrieved at a reply retrieval unit 350.

Thus, depending on the setting by the developers, the reply retrieval unit 350 can retrieve a saucy reply sentence or a selfish reply sentence, for example, from a conversation database 500 to the contents of an utterance of a user. As a result, the conversation controller 1 can be used as a device which gives a user an impression as if it had a certain personality, because it can output various reply sentences by the setting of the developers. A user can see the conversation controller 1 as a friend or a chatting friend, for example, and can feel as if he or she made conversation with another user.

(Second Modification)

When a ranking unit 360 provides the lowest rank, a reply retrieval unit 350 preferably performs processing of not retrieving a reply sentence. Also, when first morpheme information including opposition is searched and the ranking unit 360 provides the lowest rank, the reply retrieval unit 350 preferably performs processing of not retrieving a reply sentence. A conversation database 500 stores a plurality of contents of opposition to oppose to an event. As shown in FIG. 28, the contents of opposition may be "Shut up" or "You idiot," for example.

More specifically, when an emotional state determining unit 361 determines the rank of degree of emotion the lowest, the reply retrieval unit 350 retrieves a certain interrogation to a user from the conversation database 500. For example, the interrogation may be "Why are you talking like that?". The reply retrieval unit 350 outputs the retrieved interrogation to the output unit 600.

Thereafter, when receiving the contents of an utterance to the interrogation, the reply retrieval unit 350 compares the received contents of the utterance with different contents of opposition, and determines whether or not the contents of the utterance include opposition. When determining that the contents of the utterance include opposition, the reply retrieval unit 350 stops the processing of retrieving a reply sentence from the conversation database 500 (stopping processing). When determining, during the stopping processing, that subsequently received contents of utterance include an apology, the reply retrieval unit 350 resumes the processing of retrieving a reply sentence.

An apology herein means an apology to an event. As shown in FIG. 29, the contents of an apology may be "I was wrong." or "I won't say bad things anymore.", for example. A plurality of contents of apologies are stored in the conversation database 500.

When the degree of emotion or the like is ranked the lowest, the reply retrieval unit 350 can stop the processing of retrieving a suitable reply sentence. As a result, the conversation controller 1 does not output a reply sentence, depending on the determined degree of emotion or the like, and can also be used as a device which makes a user feel as if it was angry.

When the contents of a subsequent utterance include an apology during the stopping processing, the reply retrieval unit 350 can stop the stopping operation. As a result, the conversation controller 1 can stop the pretense of being angry with the user, and can therefore be used as a device which gives a user an impression as if its feeling varies.

(Third Modification)

Different pieces of topic identification information are preferably associated with one another in predetermined relationships as superordinate concepts and subordinate concepts. Based on first morpheme information extracted at a morpheme extracting unit 420, a topic identification information search unit 320 preferably compares the extracted first morpheme information with pieces of topic identification information related as superordinate concepts to a previously searched piece of topic identification information, and searches a piece of topic identification information corresponding to a morpheme constituting part of the first morpheme information from among the pieces of topic identification information.

More specifically, when a previously searched piece of topic identification information is topic identification information "A", and pieces of topic identification information related as superordinate concepts to the topic identification information "A" are topic identification information "C" and topic identification information "D", as shown in FIG. 19, for example, the topic identification information search unit 320 compares first morpheme information extracted at the morpheme extracting unit 420 with the topic identification information "C" and the topic identification information "D" related as superordinate concepts to the previously retrieved topic identification information "A", and searches the topic identification information "C", for example, corresponding to a morpheme constituting part of the first morpheme information (topic identification information "C") from among the topic identification information "C" and the topic identification information "D".

Based on the topic identification information "C" searched at the topic identification search unit 320, a topic search unit 340 compares topic titles associated with the topic identification information "C" with the first morpheme information extracted at the morpheme extracting unit 420, and searches a topic title corresponding to the first morpheme information from among the topic titles.

In this case, since the topic search unit 340 searches a topic title of a superordinate concept based on a subordinate concept, a reply sentence retrieval unit 350 can retrieve a reply sentence associated with a topic title related as a superordinate concept to a previously searched topic title. As a result, based on a topic in a previous conversation, the reply sentence retrieval unit 350 can output a reply sentence relevant to the topic.

Alternatively, based on first morpheme information extracted at the morpheme extracting unit 420, the topic identification information search unit 320 may compare the extracted first morpheme information with pieces of topic identification information related as subordinate concepts to a previously searched piece of topic identification information, and search a piece of topic identification information corresponding to a morpheme constituting part of the first morpheme information from among the pieces of topic identification information.

Alternatively, when searching a piece of topic identification information corresponding to a morpheme constituting part of first morpheme information, the topic identification information search unit 320 may search another piece of topic identification information related to a piece of topic identification information which is a superordinate concept to the retrieved piece of topic identification information.

Specifically, as shown in FIG. 19, for example, a previously searched piece of topic identification information is topic identification information "A" (e.g., team "A"), and topic identification information related as a superordinate concept to the topic identification information "A" is topic identification information "C" (e.g., baseball), and another piece of topic identification information related to the topic identification information "C" is topic identification information "B" (e.g., team "B"). The relationship between the topic identification information "B" (e.g., team "B") and the topic identification information "A" (e.g., team "A") can be considered as a sibling-like relationship (a relationship between two of strong connection) in this embodiment.

Alternatively, when searching a piece of topic identification information corresponding to a morpheme constituting part of first morpheme information, the topic identification information search unit 320 may search another piece of topic identification information (e.g., team "B") related to a piece of topic identification information (e.g., athlete "a") related as a subordinate concept to the retrieved piece of topic identification information (e.g., team "A").

When searching the topic identification information "A", for example, corresponding to a morpheme constituting part of the first morpheme information (topic identification information "A"), the topic identification information search unit 320 searches the topic identification information "B" related to the topic identification information "C" which is a superordinate concept to the topic identification information "A".

Based on the topic identification information "B" searched at the topic identification information search unit 320, the topic search unit 340 compares topic titles associated with the topic identification information "B" with the first morpheme information extracted at the morpheme extracting unit 420, and searches a topic title corresponding to the first morpheme information from among the topic titles.

INDUSTRIAL APPLICABILITY

As described above, according to the present invention, it is possible to identify morphemes constituting input information received from a user and search prepared reply sentences associated with the identified morphemes, so as to output an appropriate reply sentence to the input information from the user, and also to output an appropriate reply sentence even with a reduced number of reply sentences stored.

The invention claimed is:

1. A conversation control computer comprising a general-purpose computer for implementing a conversation controller and conversation control method according to a program therefor stored on a nontransitory physical storage medium operable with the general-purpose computer, the conversation control computer being configured to retrieve, based on input information received from a user, a reply sentence to the input information and comprising:

a morpheme extracting unit configured to extract, based on a character string corresponding to the input information, at least one morpheme constituting a minimum unit of the character string, as first morpheme information;

a conversation database configured to store pieces of second morpheme information each including a morpheme including a character, a string of characters or a combination thereof, and a plurality of reply sentences, which are associated with the pieces of second morpheme information;

a topic search unit configured to compare, based on the first morpheme information extracted at the morpheme extracting unit, the first morpheme information with the pieces of second morpheme information, and to search a piece of second morpheme information including a portion of the first morpheme information from among the pieces of second morpheme information;

a reply retrieval unit configured to retrieve, based on the piece of second morpheme information searched at the topic search unit, a reply sentence associated with the searched piece of second morpheme information;

a topic identification information search unit configured to compare, based on the first morpheme information extracted at the morpheme extracting unit, the first morpheme information with pieces of topic identification information for identifying a topic, and to search a piece of topic identification information corresponding to the at least one morpheme constituting the first morpheme information from among the pieces of topic identification information, wherein the pieces of topic identification information are each associated with pieces of second morpheme information;

the topic search unit is configured to compare, based on the searched piece of topic identification information, pieces of second morpheme information associated with the searched piece of topic identification information with the first morpheme information extracted at the morpheme extracting unit, and to search a piece of second morpheme information corresponding to the first morpheme information from among the pieces of second morpheme information associated with the searched piece of topic identification information; and an elliptical sentence supplementation unit configured to add the searched piece of topic identification information to the first morpheme information extracted at the morpheme extracting unit to provide a supplemented first morpheme information when no piece of second morpheme information including a portion of the extracted first morpheme information can be located by the search performed at the topic search unit, wherein, the topic search unit is configured to search, based on the supplemented first morpheme information, a piece of second morpheme information including a portion of the supplemented first morpheme information from among the pieces of second morpheme information.

2. The conversation control computer as set forth in claim 1, further comprising:
an input type determining unit configured to determine, based on the character string corresponding to the input information, a type of input, wherein the reply sentences are each associated with types of responses; and
the reply retrieval unit is configured to compare, based on the piece of second morpheme information searched at the topic search unit, types of responses associated with the piece of second morpheme information searched at the topic search unit with the determined type of input, to search a type of response corresponding to the type of input from among the types of responses, and to retrieve a reply sentence associated with the retrieved type of response.

3. The conversation control computer as set forth in claim 2, wherein said type of input includes affirmation or negation.

4. The conversation control computer as set forth in claim 1, further comprising:
a ranking unit configured to perform a ranking according to a frequency of search of a piece of second morpheme information at the topic search unit, wherein:
the reply sentences are each associated with priority levels; and
the reply retrieval unit is configured to compare the priority levels associated with the reply sentences with the rank determined at the ranking unit, to identify a priority level corresponding to the determined rank from among the priority levels, and to retrieve a reply sentence associated with the identified priority level.

5. The conversation control computer as set forth in claim 1, further comprising:
a ranking unit configured to perform a ranking according to a frequency of search of a piece of second morpheme information at the topic search unit, wherein:
the reply sentences are each associated with priority levels; and
the reply retrieval unit is configured to compare the priority levels associated with the reply sentences with the rank determined at the ranking unit, to identify a priority level corresponding to the determined rank from among the priority levels, and to retrieve a reply sentence associated with the identified priority level; and
the reply retrieval unit is configured to not retrieve the reply sentence when the rank determined at the ranking unit is the lowest.

6. The conversation control computer as set forth in claim 1, wherein:
the pieces of topic identification information are associated with one another in predetermined relationships as superordinate concepts or subordinate concepts; and
the topic identification information search unit is configured to compare, based on the first morpheme information extracted at the morpheme extracting unit, the extracted first morpheme information with related superordinate pieces of topic identification information, said related superordinate pieces of topic identification information being related to the searched piece of topic identification information as superordinate concepts, and to further search a piece of topic identification information corresponding to the morpheme constituting the first morpheme information from among the related superordinate pieces of topic identification information.

7. The conversation control computer as set forth in claim 1, wherein:
the pieces of topic identification information are associated with one another in predetermined relationships as superordinate concepts or subordinate concepts; and
the topic identification information search unit is configured to search another piece of topic identification information, said another piece of topic identification information being associated with a piece of topic identification information which is a superordinate concept to the searched piece of topic identification information.

8. A computer-readable nontransitory physical storage medium encoded with a program for executing a conversation control method for retrieving, based on input information received from a user, a reply sentence to the input information, the conversation control method comprising:
a first step of extracting, based on a character string corresponding to the input information, at least one morpheme constituting a minimum unit of the character string, as first morpheme information;
a second step of comparing, based on the first morpheme information extracted in the first step, the first morpheme information with stored pieces of second morpheme information, and searching a piece of second morpheme information including a portion of the first morpheme information from among the pieces of second morpheme information;
a third step of retrieving, based on the piece of second morpheme information searched in the second step, a reply sentence associated with the searched piece of second morpheme information;
a fourth step of comparing, based on the first morpheme information extracted in the first step, the first morpheme information with pieces of topic identification information for identifying a topic, and searching a piece of topic identification information corresponding to the at least one morpheme constituting the first morpheme information from among the pieces of topic identification information, wherein:
the pieces of topic identification information are each associated with pieces of second morpheme information;
the pieces of second morpheme information are each associated with reply sentences; and
in the second step, based on the searched piece of topic identification information, pieces of second morpheme information associated with the searched piece of topic identification information are compared with the first morpheme information extracted in the first step and a piece of second morpheme information corresponding to the first morpheme information is searched from among the pieces of second morpheme information associated with the searched piece of topic identification information; and
a fifth step supplementing elliptical sentences by adding a piece of topic identification information previously searched in the fourth step to the extracted first morpheme information to obtain modified first morpheme information when no piece of second morpheme information including a portion of the extracted first morpheme information can be located by the search in the second step, wherein:
in the second step, based on the modified first morpheme information, a piece of second morpheme information including a portion of the modified first morpheme information is searched from among the pieces of second morpheme information.

9. The computer-readable nontransitory physical storage medium as set forth in claim 8, the conversation control method further comprising another step of determining, based on the character string corresponding to the input information, a type of input, wherein:
- the pieces of second morpheme information are each associated with a plurality of reply sentences;
- the reply sentences are each associated with types of responses; and
- in the third step, based on the piece of second morpheme information searched in the second step, the types of responses associated with the piece of second morpheme information searched in the second step are compared with the determined type of input;
- a type of response corresponding to the determined type of input is searched from among the types of responses; and
- a reply sentence associated with a searched type of response is retrieved.

10. The computer-readable nontransitory physical storage medium as set forth in claim 9, wherein in the conversation control method said type of input includes affirmation or negation.

11. The computer-readable nontransitory physical storage medium as set forth in claim 8, the conversation control method further comprising:
- a step of performing ranking according to a frequency of search of the piece of second morpheme information in the second step, wherein
- the pieces of second morpheme information are each associated with a plurality of reply sentences;
- the reply sentences are each associated with priority levels; and
- in the third step, based on the piece of second morpheme information searched in the second step, the priority levels associated with the reply sentences are compared with a rank determined in the step of performing ranking, a priority level corresponding to the rank is identified from among the priority levels, and a reply sentence associated with the identified priority level is retrieved.

12. The computer-readable nontransitory physical storage medium as set forth in claim 8, the conversation control method further comprising:
- a step of performing ranking according to a frequency of search of the piece of second morpheme information in the second step, wherein:
- the pieces of second morpheme information are each associated with a plurality of reply sentences;
- the reply sentences are each associated with priority levels;
- in the third step, based on the piece of second morpheme information searched in the second step, the priority levels associated with the reply sentences are compared with a rank determined in the step of performing ranking, a priority level corresponding to the rank is identified from among the priority levels, and a reply sentence associated with the identified priority level is retrieved; and when the rank determined in the step of performing ranking is the lowest, a reply sentence is not retrieved.

13. The computer-readable nontransitory physical storage medium as set forth in claim 8, wherein in the conversation control method:
- the pieces of topic identification information are associated with one another in predetermined relationships as superordinate concepts or subordinate concepts; and
- in the fourth step of comparing, based on the first morpheme information extracted in the first step, the extracted first morpheme information is compared with related superordinate pieces of topic identification information, said related superordinate pieces of topic identification information being related to the searched piece of topic identification information as superordinate concepts, and a piece of topic identification information corresponding to the at least one morpheme constituting the first morpheme information is searched from among the related superordinate pieces of topic identification information.

14. The computer-readable nontransitory physical storage medium as set forth in claim 8, wherein in the conversation control method:
- the pieces of topic identification information are associated with one another in predetermined relationships as superordinate concepts or subordinate concepts; and
- in the fourth step of comparing, when a piece of topic identification information corresponding to the at least one morpheme constituting the first morpheme information is searched, another piece of topic identification information related to a piece of topic identification information which is a superordinate concept to the searched piece of topic identification information is searched.

* * * * *